United States Patent
Gerhardt et al.

(10) Patent No.: US 9,453,112 B2
(45) Date of Patent: Sep. 27, 2016

(54) PHOSPHORUS-CONTAINING POLYMER, ARTICLE, AND PROCESSES FOR PRODUCING THE SAME

(71) Applicant: MILLIKEN & COMPANY, Spartanburg, SC (US)

(72) Inventors: Warren W. Gerhardt, Greer, SC (US); Jason M. Spruell, Spartanburg, SC (US); Daniel T. McBride, Chesnee, SC (US); Petr Valenta, Greer, SC (US); Rajib Mondal, Greer, SC (US); Stephen D. Lucas, Boiling Springs, SC (US)

(73) Assignee: Milliken & Company, Spartanburg, SC (US)

( * ) Notice: Subject to any disclaimer, the term of this patent is extended or adjusted under 35 U.S.C. 154(b) by 46 days.

(21) Appl. No.: 14/292,144

(22) Filed: May 30, 2014

(65) Prior Publication Data
US 2014/0357146 A1    Dec. 4, 2014

Related U.S. Application Data

(60) Provisional application No. 61/831,131, filed on Jun. 4, 2013.

(51) Int. Cl.
*C08G 79/04* (2006.01)
*C09D 5/18* (2006.01)
(Continued)

(52) U.S. Cl.
CPC ............... *C08G 79/04* (2013.01); *B05D 3/02* (2013.01); *B05D 3/10* (2013.01); *C09D 5/18* (2013.01); *C09K 3/00* (2013.01); *C09K 21/00* (2013.01); *C09K 21/14* (2013.01); *D03D 1/00* (2013.01); *D03D 13/00* (2013.01); *D03D 15/00* (2013.01); *D03D 25/00* (2013.01); *D06M 13/285* (2013.01);
(Continued)

(58) Field of Classification Search
CPC ........................................................ C08G 79/04
USPC ............ 528/398, 367; 442/153, 59; 427/243
See application file for complete search history.

(56) References Cited

U.S. PATENT DOCUMENTS

| | | | |
|---|---|---|---|
| 4,013,813 A | 3/1977 | LeBlanc et al. |
| 4,151,322 A | 4/1979 | Rosenthal et al. |
| 4,732,789 A | 3/1988 | Hauser et al. |
| 4,918,795 A | 4/1990 | Dischler |
| 5,033,143 A | 7/1991 | Love, III |

(Continued)

FOREIGN PATENT DOCUMENTS

EP    0 688 898 A1    12/1995

OTHER PUBLICATIONS

Soignet et al., Electron Spectroscopy for Chemical Analyses (ESCA) of THPOH-NH$_3$-Treated Fabrics, *Textile Research Journal*, Southern Regional Research Center, New Orleans, Louisiana 70179, USA.

(Continued)

*Primary Examiner* — Duc Truong
(74) *Attorney, Agent, or Firm* — Robert M. Lanning

(57) ABSTRACT

A phosphorus-containing polymer comprises a plurality of phosphorus atoms, wherein about 75% or more of the phosphorus atoms in the phosphorus-containing polymer are present in phosphine oxide moieties. An article comprises a textile material having at least one surface and a phosphorus-containing polymer disposed on a least a portion of the surface, wherein the phosphorus-containing polymer comprises a plurality of phosphorus atoms, and wherein about 75% or more of the phosphorus atoms in the phosphorus-containing polymer are present in phosphine oxide moieties.

30 Claims, 7 Drawing Sheets

(51) Int. Cl.
  *D03D 15/00* (2006.01)
  *D06M 13/285* (2006.01)
  *D06M 15/431* (2006.01)
  *C09K 21/14* (2006.01)
  *B05D 3/10* (2006.01)
  *B05D 3/02* (2006.01)
  *C09K 21/00* (2006.01)
  *C09K 3/00* (2006.01)
  *D03D 1/00* (2006.01)
  *D03D 13/00* (2006.01)
  *D03D 25/00* (2006.01)
  *C08G 79/02* (2016.01)
  *B05D 7/24* (2006.01)

(52) U.S. Cl.
  CPC ........ *D06M 15/431* (2013.01); *D10B 2201/00* (2013.01); *Y10T 442/20* (2015.04); *Y10T 442/277* (2015.04)

(56) References Cited

U.S. PATENT DOCUMENTS

| | | |
|---|---|---|
| 5,468,585 A | 11/1995 | Matsumoto et al. |
| 6,546,605 B1 | 4/2003 | Emery et al. |
| 7,713,891 B1 | 5/2010 | Li et al. |
| 8,012,890 B1 | 9/2011 | Li et al. |
| 8,012,891 B2 | 9/2011 | Li et al. |
| 2008/0038973 A1 | 2/2008 | Sasser et al. |
| 2011/0092119 A1 | 4/2011 | Cliver et al. |
| 2011/0275263 A1 | 11/2011 | Li et al. |
| 2011/0275264 A1 | 11/2011 | McBride et al. |
| 2011/0281097 A1 | 11/2011 | Li et al. |

OTHER PUBLICATIONS

PCT/US2014/040526, International Search Report, International filing Jun. 2, 2014, 5 pages.
PCT/US2014/040526, Written Opinion, International filing date Jun. 2, 2014, 4 pages.

PHOSPHORUS-CONTAINING POLYMER, ARTICLE, AND PROCESSES FOR PRODUCING THE SAME

TECHNICAL FIELD OF THE INVENTION

This application relates to flame retardant, phosphorus-containing polymers, processes for producing such polymers, articles comprising such polymers (e.g., textile materials treated with such polymers), and processes for producing such articles.

BACKGROUND

Flame retardant, phosphorus-containing polymers are well-known in the industry. These polymers are used to impart a degree of flame resistance to cellulose-containing fabrics, such as cotton fabrics. The polymers typically are produced by padding a tetrahydroxymethyl phosphonium compound and a suitable cross-linking agent onto the fabric and reacting the two to form the polymer. The polymers produced by this reaction are known to release formaldehyde overtime, which can be problematic for a variety of reasons. The industry has attempted to develop means to solve this formaldehyde generation problem, but these means seldom provide a long term solution. Indeed, many of the solutions lose their efficacy after the treated fabric is washed only a couple of times and the polymer on the fabric then begins to release formaldehyde.

A need therefore remains for improved flame retardant, phosphorus-containing polymers that generate reduced amounts of formaldehyde. A need also remains for processes for producing such polymers and articles treated with such polymers. The invention described in this application aims to satisfy such need.

BRIEF SUMMARY OF THE INVENTION

In a first embodiment, the invention provides a phosphorus-containing polymer comprising a plurality of phosphorus atoms, wherein about 75% or more of the phosphorus atoms in the phosphorus-containing polymer are present in phosphine oxide moieties conforming to a structure selected from the group consisting of Formula (X), Formula (XI), and Formula (XII)

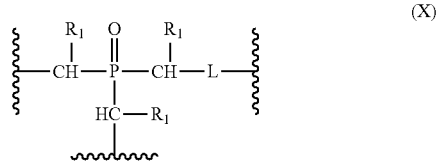

(X)

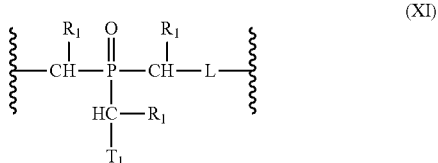

(XI)

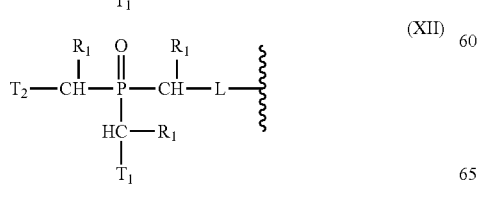

(XII)

wherein, in each structure, $R_1$ is independently selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; $T_1$ and $T_2$ are independently selected from the group consisting of a hydroxy group and univalent moieties comprising at least one nitrogen atom; and L is a polyvalent linking group comprising at least one nitrogen atom.

In a second embodiment, the invention provides a process for producing a phosphorus-containing polymer, the process comprising the steps of:

(a) providing a phosphonium compound comprising at least one phosphonium moiety, the phosphonium moiety conforming to the structure of Formula (I)

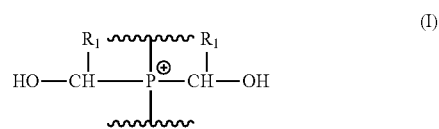

(I)

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl;

(b) providing a nitrogen-containing cross-linking compound, the nitrogen-containing cross-linking compound comprising two or more nitrogen-hydrogen bonds;

(c) reacting the phosphorus-containing compound and the nitrogen-containing cross-linking compound in a condensation reaction to produce a first intermediate polymer, the first intermediate polymer comprising a plurality of phosphorus atoms, at least a portion of the phosphorus atoms being present in phosphonium moieties;

(d) exposing the first intermediate polymer to a Brønsted base under conditions sufficient to convert at least a portion of the phosphonium moieties to phosphine moieties thereby producing a second intermediate polymer; and (e) oxidizing the second intermediate polymer by exposing the second intermediate polymer to a suitable oxidizing agent under conditions sufficient to oxidize at least a portion of the phosphorus atoms in the polymer to a pentavalent state thereby producing a phosphorus-containing polymer.

In a third embodiment, the invention provides an article comprising a textile material having at least one surface and a phosphorus-containing polymer disposed on a least a portion of the surface, wherein the phosphorus-containing polymer comprises a plurality of phosphorus atoms, and wherein about 75% or more of the phosphorus atoms in the phosphorus-containing polymer are present in phosphine oxide moieties conforming to a structure selected from the group consisting of Formula (X), Formula (XI), and Formula (XII)

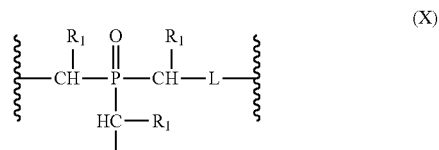

(X)

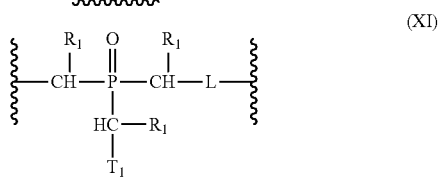

(XI)

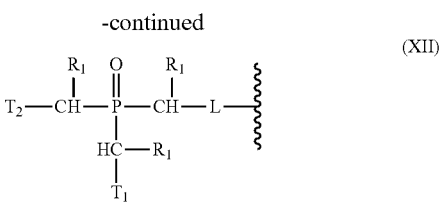

(XII)

wherein, in each structure, $R_1$ is independently selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; $T_1$ and $T_2$ are independently selected from the group consisting of a hydroxy group and univalent moieties comprising at least one nitrogen atom; and L is a polyvalent linking group comprising at least one nitrogen atom.

In a fourth embodiment, the invention provides a process for producing an article, the process comprising the steps of:

(a) providing a textile material having at least one surface;

(b) providing a phosphonium compound comprising at least one phosphonium moiety, the phosphonium moiety conforming to the structure of Formula (I)

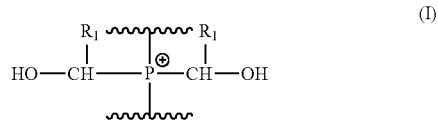

(I)

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl;

(c) providing a nitrogen-containing cross-linking compound, the nitrogen-containing cross-linking compound comprising two or more nitrogen-hydrogen bonds;

(d) applying the phosphorus-containing compound and the nitrogen-containing compound to at least a portion of the surface of the textile material;

(e) reacting the phosphorus-containing compound and the nitrogen-containing cross-linking compound in a condensation reaction to produce a first intermediate polymer on the surface of the textile material, the first intermediate polymer comprising a plurality of phosphorus atoms, at least a portion of the phosphorus atoms being present in phosphonium moieties;

(f) exposing the textile material to a Brønsted base under conditions sufficient to convert at least a portion of the phosphonium moieties in the first intermediate polymer to phosphine moieties thereby producing a second intermediate polymer on the surface of the textile material; and (g) oxidizing the second intermediate polymer on the surface of the textile material by exposing the textile material to a suitable oxidizing agent under conditions sufficient to oxidize at least a portion of the phosphorus atoms in the polymer to a pentavalent state thereby producing a phosphorus-containing polymer on the surface of the textile material.

BRIEF DESCRIPTION OF THE DRAWINGS

FIG. 1A also includes a table providing the calculated area for each of the "deconvoluted" peaks.

FIG. 2A also includes a table providing the calculated area for each of the "deconvoluted" peaks.

FIG. 3 also shows a "deconvoluted" spectrum superimposed over the original spectrum. FIG. 3 also includes a table providing the calculated area for each of the "deconvoluted" peaks.

FIG. 4A also includes a table providing the calculated area for the "deconvoluted" peaks.

DETAILED DESCRIPTION OF THE INVENTION

Figure 1:
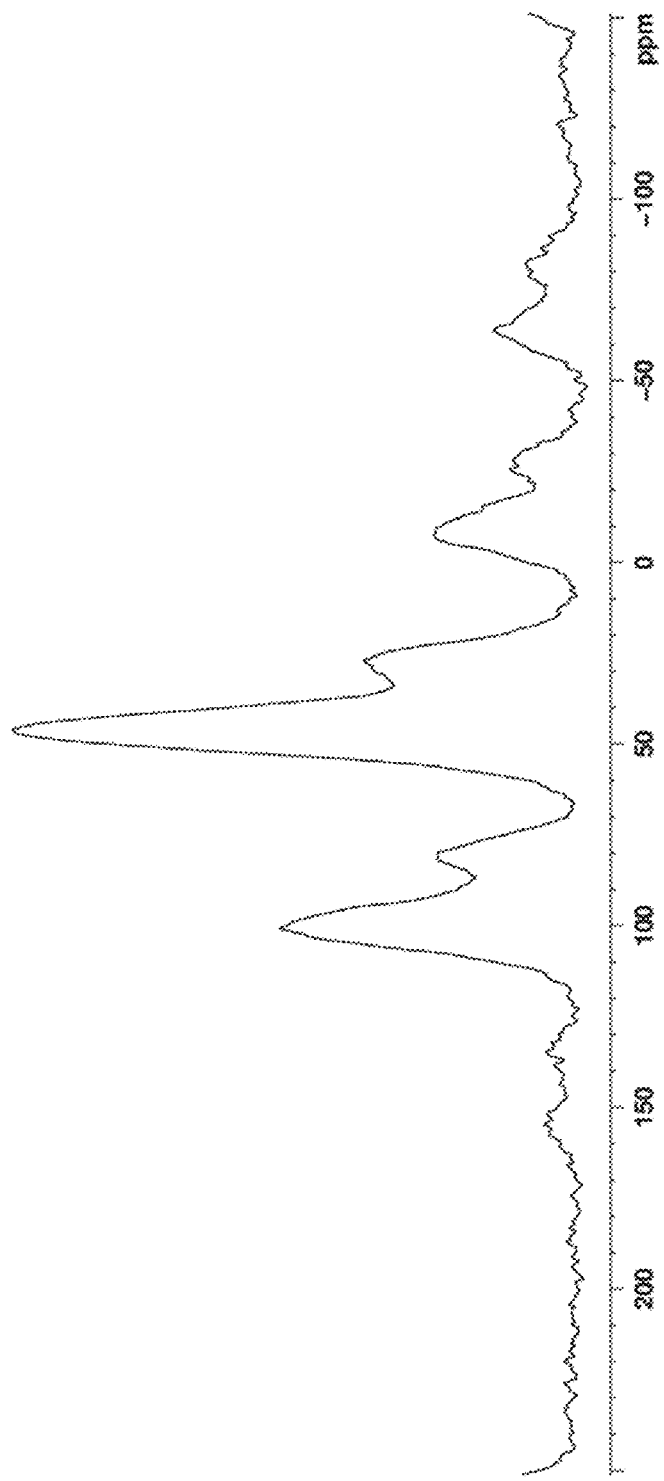
FIG. 1 is the $^{31}$P nuclear magnetic resonance (NMR) spectrum for the flame retardant, phosphorus-containing polymer from a commercially-available flame resistant textile article.

In a first embodiment, the invention provides a phosphorus-containing polymer. The polymer comprises a plurality of phosphorus atoms. Most of these phosphorus atoms are present in the "backbone" of the polymer, meaning that the phosphorus atoms are joined together by intervening linking moieties. This is in contrast to some phosphorus-containing polymers in which the phosphorus atoms are contained in pendant groups that are attached to the polymer backbone.

The phosphorus atoms are present in the polymer in phosphorus-containing moieties. As noted above, these phosphorus-containing moieties are bonded to adjacent phosphorus-containing moieties, thereby forming the backbone of the polymer chain. In these moieties, the phosphorus atoms can be present in different oxidation states, which yield different phosphorus-containing moieties. In particular, it is believed that within the polymer the phosphorus atoms can exist in one of two oxidation states: phosphorus (III) or phosphorus (V). The phosphorus atoms in the phosphorus (III) oxidation state can be present in phosphine moieties or phosphonium moieties; and the phosphorus atoms in the phosphorus (V) oxidation state are present in phosphine oxide moieties.

Preferably, at least a portion of the phosphorus atoms are present in the phosphorus-containing polymer in phosphine oxide moieties conforming to a structure selected from the group consisting of Formula (X), Formula (XI), and Formula (XII)

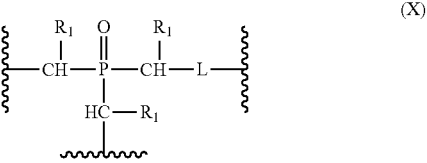

(X)

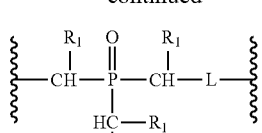

(XI)

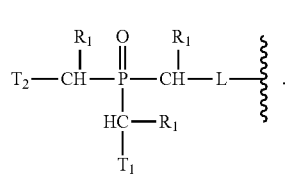

(XII)

In the structures of Formula (X), Formula (XI), and Formula (XII), $R_1$ can be any suitable group, such as an alkyl group, a haloalkyl group, an alkenyl group, or a haloalkenyl group; $T_1$ and $T_2$ are independently selected from the group consisting of a hydroxy group and univalent moieties comprising at least one nitrogen atom; and L is a polyvalent linking group comprising at least one nitrogen atom. As used herein, the term "polyvalent" in reference to the linking group L means that the linking group has two or more bonds to adjacent moieties. Thus, even though the structures set forth in the application only show two bonds emanating from the linking group, it is possible for the linking group to be bonded to more than two adjacent moieties.

In a preferred embodiment, $R_1$ is independently selected from the group consisting of hydrogen, $C_1$-$C_3$ alkyl, $C_1$-$C_3$ haloalkyl, $C_2$-$C_3$ alkenyl, and $C_2$-$C_3$ haloalkenyl. In the structure of Formula (X), Formula (XI), Formula (XII), and the structures that follow, the partial bonds (i.e., the bonds truncated by the wavy line) represent bonds to adjacent phosphorus-containing moieties, such as moieties conforming to the structures of Formula (X), (XI), and (XII) as well as the other phosphorus-containing moieties described below. In a preferred embodiment, $R_1$ is hydrogen.

In another preferred embodiment, $T_1$ and $T_2$ are independently selected from the group consisting of a hydroxy group and univalent moieties comprising at least one nitrogen atom that are produced by a reaction with a compound selected from the group consisting of urea, an alkylene urea, a guanidine (i.e., guanidine, a salt thereof, or a guanidine derivative), melamine, a melamine derivative, guanamine, guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. Given the manner in which the polymer is produced (which is described in detail below), the structure of the T can vary from phosphine oxide moiety to phosphine oxide moiety. This can occur if only a portion of the terminal hydroxy groups on the phosphonium compound react with the cross-linking compound, which would yield a polymer containing a mixture of terminal hydroxy groups and terminal nitrogen moieties. This can also occur if a mixture of different cross-linking compounds is used to produce the polymer. Preferably, $T_1$ and $T_2$ are independently selected from the group consisting of a hydroxy group and moieties produced by a reaction with a compound selected from the group consisting of ammonia, urea, alkylene urea compounds, melamine, guanidine, guanidine derivatives, dicyandiamide, and mixtures thereof.

In another preferred embodiment, each L is a polyvalent linking group produced by a reaction with a compound selected from the group consisting of urea, an alkylene urea, a guanidine (i.e., guanidine, a salt thereof, or a guanidine derivative), melamine, a melamine derivative, guanamine, guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. Given the manner in which the polymer is produced (which is described in detail below), the structure of the linking group (L) can vary from phosphine oxide moiety to phosphine oxide moiety. This can occur if a mixture of different cross-linking compounds is used to produce the polymer. Preferably, L is a polyvalent linking group produced by a reaction with a compound selected from the group consisting of ammonia, urea, alkylene urea compounds, melamine, guanidine, guanidine derivatives, dicyandiamide, and mixtures thereof.

In a preferred embodiment, about 75% or more of the phosphorus atoms in the phosphorus-containing polymer are present in phosphine oxide moieties conforming to a structure selected from the group consisting of Formula (X), Formula (XI), and Formula (XII). More preferably, about 80% or more of the phosphorus atoms in the phosphorus-containing polymer are present in phosphine oxide moieties conforming to a structure selected from the group consisting of Formula (X), Formula (XI), and Formula (XII). Most preferably, about 85% or more (e.g., about 90% or more) of the phosphorus atoms in the phosphorus-containing polymer are present in phosphine oxide moieties conforming to a structure selected from the group consisting of Formula (X), Formula (XI), and Formula (XII).

The remaining phosphorus atoms in the phosphorus-containing polymer preferably are present in moieties selected from the group consisting of phosphine moieties and phosphonium moieties. The phosphine moieties preferably conform to a structure selected from the group consisting of Formula (XV), Formula (XVI), and Formula (XVII)

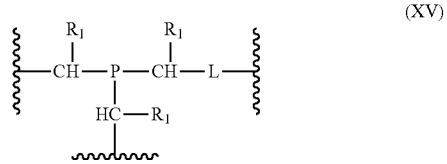

(XV)

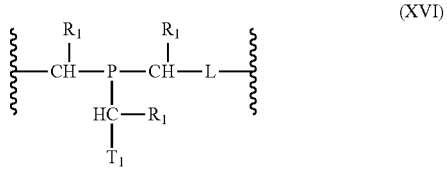

(XVI)

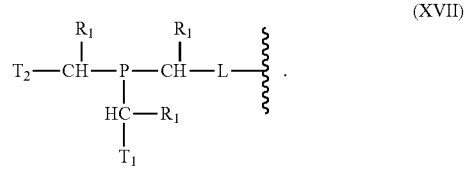

(XVII)

In the structures of Formula (XV), Formula (XVI), and Formula (XVII), $R_1$ can be any suitable group, such as an alkyl group, a haloalkyl group, an alkenyl group, or a haloalkenyl group; $T_1$ and $T_2$ are independently selected from the group consisting of a hydroxy group and univalent moieties comprising at least one nitrogen atom; and L is a polyvalent linking group comprising at least one nitrogen atom. In a preferred embodiment, $R_1$ is independently selected from the group consisting of hydrogen, $C_1$-$C_3$ alkyl, $C_1$-$C_3$ haloalkyl, $C_2$-$C_3$ alkenyl, and $C_2$-$C_3$ haloalkenyl. In a preferred embodiment, $R_1$ is hydrogen. In another preferred embodiment, $T_1$ and $T_2$ are independently selected from the group consisting of a hydroxy group and univalent moieties comprising at least one nitrogen atom that are produced by a reaction with a compound selected from the group consisting of urea, an alkylene urea, a guanidine (i.e., guanidine, a salt thereof, or a guanidine derivative), melamine, a melamine derivative, guanamine, guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. As with the structures of Formula (X), Formula (XI), and Formula (XII), the structure of T can vary from phosphine moiety to phosphine moiety. Preferably, $T_1$ and $T_2$ are independently selected from the group consisting of a hydroxy group and moieties produced by a reaction with a compound selected from the group consisting of ammonia, urea, alkylene urea compounds, melamine, guanidine, guanidine derivatives, dicyandiamide, and mixtures thereof. In another preferred embodiment, each L is a polyvalent linking group produced by a reaction with a compound selected from the group consisting of urea, an alkylene urea, a guanidine (i.e., guanidine, a salt thereof, or a guanidine derivative), melamine, a melamine derivative, guanamine, guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. As with the structures of Formula (X), Formula (XI), and Formula (XII), the structure of the linking group (L) can vary from phosphine moiety to phosphine moiety. Preferably, L is a polyvalent linking group produced by a reaction with a compound selected from the group consisting of ammonia, urea, alkylene urea compounds, melamine, guanidine, guanidine derivatives, dicyandiamide, and mixtures thereof.

The phosphonium moieties preferably conform to a structure selected from the group consisting of Formula (XX), Formula (XXI), Formula (XXII), and Formula (XXIII)

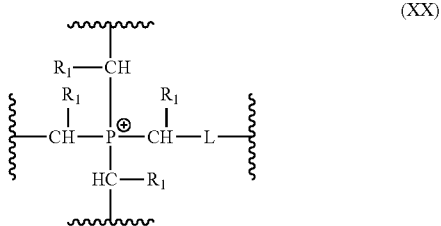

(XX)

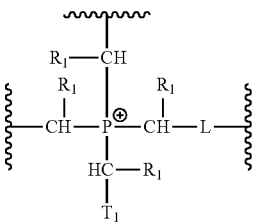

(XXI)

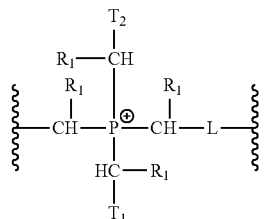

(XXII)

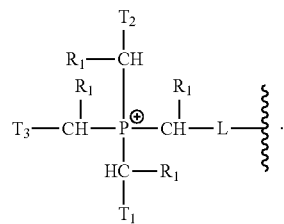

(XXIII)

In the structures of Formula (XX), Formula (XXI), Formula (XXII), and Formula (XXIII), $R_1$ can be any suitable group, such as an alkyl group, a haloalkyl group, an alkenyl group, or a haloalkenyl group; $T_1$, $T_2$, and $T_3$ are independently selected from the group consisting of a hydroxy group and univalent moieties comprising at least one nitrogen atom; and L is a polyvalent linking group comprising at least one nitrogen atom. In a preferred embodiment, $R_1$ is independently selected from the group consisting of hydrogen, $C_1$-$C_3$ alkyl, $C_1$-$C_3$ haloalkyl, $C_2$-$C_3$ alkenyl, and $C_2$-$C_3$ haloalkenyl. In a preferred embodiment, $R_1$ is hydrogen. In another preferred embodiment, $T_1$, $T_2$, and $T_3$ are independently selected from the group consisting of a hydroxy group and univalent moieties comprising at least one nitrogen atom that are produced by a reaction with a compound selected from the group consisting of urea, an alkylene urea, a guanidine (i.e., guanidine, a salt thereof, or a guanidine derivative), melamine, a melamine derivative, guanamine, guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. As with the structures of Formula (X), Formula (XI), and Formula (XII), the structure of T can vary from phosphonium moiety to phosphonium moiety. Preferably, $T_1$, $T_2$, and $T_3$ are independently selected from the group consisting of a hydroxy group and moieties produced by a reaction with a compound selected from the group consisting of ammonia, urea, alkylene urea compounds, melamine, guanidine, guanidine derivatives, dicyandiamide, and mixtures thereof. In another preferred embodiment, each L is a polyvalent linking group produced by a reaction with a compound selected from the group consisting of urea, an alkylene urea, a guanidine (i.e., guanidine, a salt thereof, or a guanidine derivative), melamine, a melamine derivative, guanamine, guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. As with the structures of Formula (X), Formula (XI), and Formula (XII), the structure of the linking group (L) can vary from phosphonium moiety to phosphonium moiety. Preferably, L is a polyvalent linking group produced by a reaction with a compound selected from the group consisting of ammonia, urea, alkylene urea compounds, melamine, guanidine, guanidine derivatives, dicyandiamide, and mixtures thereof.

The phosphonium moieties conforming to a structure selected from the group consisting of Formula (XX), Formula (XXI), Formula (XXII), and Formula (XXIII) can have any suitable counterion. Suitable counterions include, but are not limited to, halides (e.g., chloride), sulfate, hydrogen sulfate, phosphate, acetate, carbonate, bicarbonate, borate, and hydroxide.

Preferably, about 25% or less of the phosphorus atoms in the phosphorus-containing polymer are present in phosphine moieties and phosphonium moieties, such as the moieties of Formulae (XV), (XVI), (XVII), (XX), (XXI), (XXII), and (XXIII) above. More preferably, about 20% or less of the phosphorus atoms in the phosphorus-containing polymer are present in phosphine moieties and phosphonium moieties, such as the moieties of Formulae (XV), (XVI), (XVII), (XX), (XXI), (XXII), and (XXIII) above. Most preferably, about 15% or less (e.g., about 10% or less) of the phosphorus atoms in the phosphorus-containing polymer are present in phosphine moieties and phosphonium moieties, such as the moieties of Formulae (XV), (XVI), (XVII), (XX), (XXI), (XXII), and (XXIII) above.

The phosphorus-containing polymer preferably comprises a relatively small amount of phosphorus atoms in phosphine moieties. In a preferred embodiment, about 5% or less of the phosphorus atoms in the phosphorus-containing polymer are present in phosphine moieties, such as the moieties of Formulae (XV), (XVI), and (XVII) above. More preferably, about 3% or less of the phosphorus atoms in the phosphorus-containing polymer are present in phosphine moieties, such as the moieties of Formulae (XV), (XVI), and (XVII) above. Most preferably, about 1% or less of the phosphorus atoms in the phosphorus-containing polymer are present in phosphine moieties, such as the moieties of Formulae (XV), (XVI), and (XVII) above.

The amount of phosphorus atoms present in each of the oxidation states and corresponding moieties can be determined by any suitable method. Since the amounts and ranges provided above refer to the amounts of atoms throughout the polymer, the method used to characterize the phosphorus atoms in the polymer should be selected so that it can characterize atoms located throughout the polymer, rather than only those atoms proximate to the surface of the polymer film. Preferably, the polymer is analyzed using solid state $^{31}$P nuclear magnetic resonance (NMR) using a direct acquire Bloch decay pulse sequence (direct excitation and detection on phosphorus run with proton decoupling). In order to increase the resolution of the NMR spectra, the samples should be spun at 11 kHz at the magic angle with respect to the direction of the magnetic field. This magic angle spinning results in spinning sidebands emanating from the isotropic peak at 11 kHz periods. In the resulting spectra, phosphorus atoms in different oxidation states exhibit different chemical shifts. The phosphorus atoms in the phosphine moieties exhibit an isotropic peak at a chemical shift of approximately −27 ppm. The phosphorus atoms in the phosphonium moieties exhibit an isotropic peak at a chemical shift of approximately 28 ppm with sidebands at approximately −80 ppm and 81 ppm. The phosphorus atoms in the phosphine oxide moieties exhibit an isotropic peak at a chemical shift of approximately 45 ppm with sidebands at approximately −65 ppm, −11 ppm, and 153 ppm. The isotropic peaks and the sideband peaks at these different chemical shifts can be used to both qualitatively confirm the presence of phosphorus atoms in a given oxidation state and to quantify the relative amount of phosphorus atoms in each oxidation state.

Figure 1A:
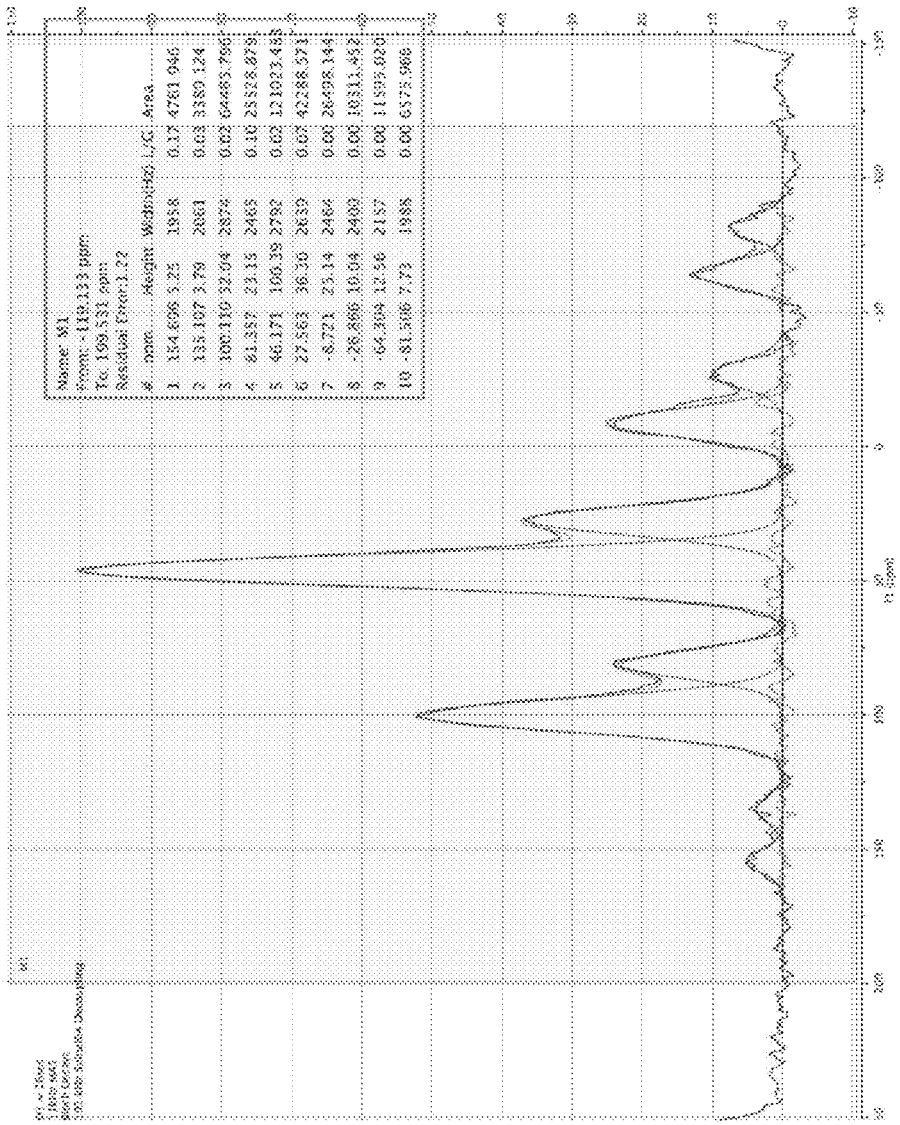
FIG. 1A shows the $^{31}$P NMR spectrum from FIG. 1 with a "deconvoluted" spectrum superimposed over the original spectrum.
Figure 2:
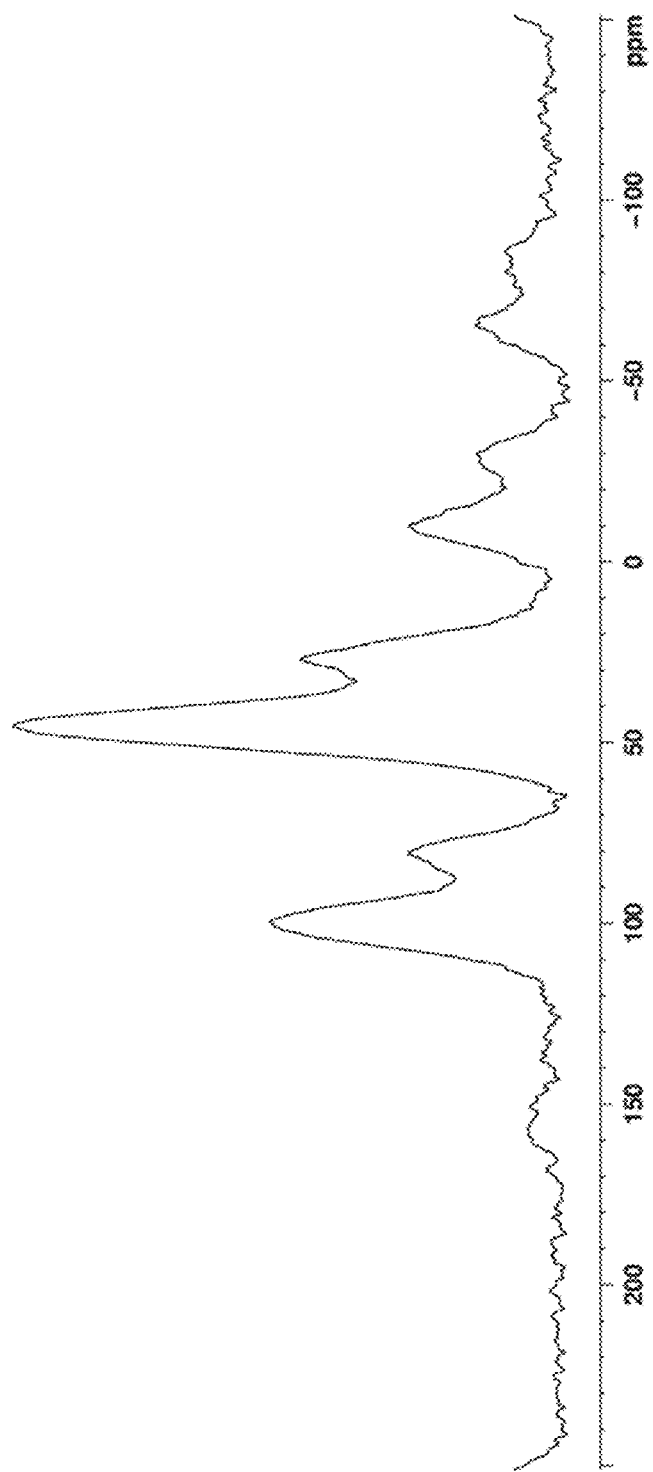
FIG. 2 is the $^{31}$P NMR spectrum for the flame retardant, phosphorus-containing polymer from another commercially-available flame resistant textile article.
Figure 2A:
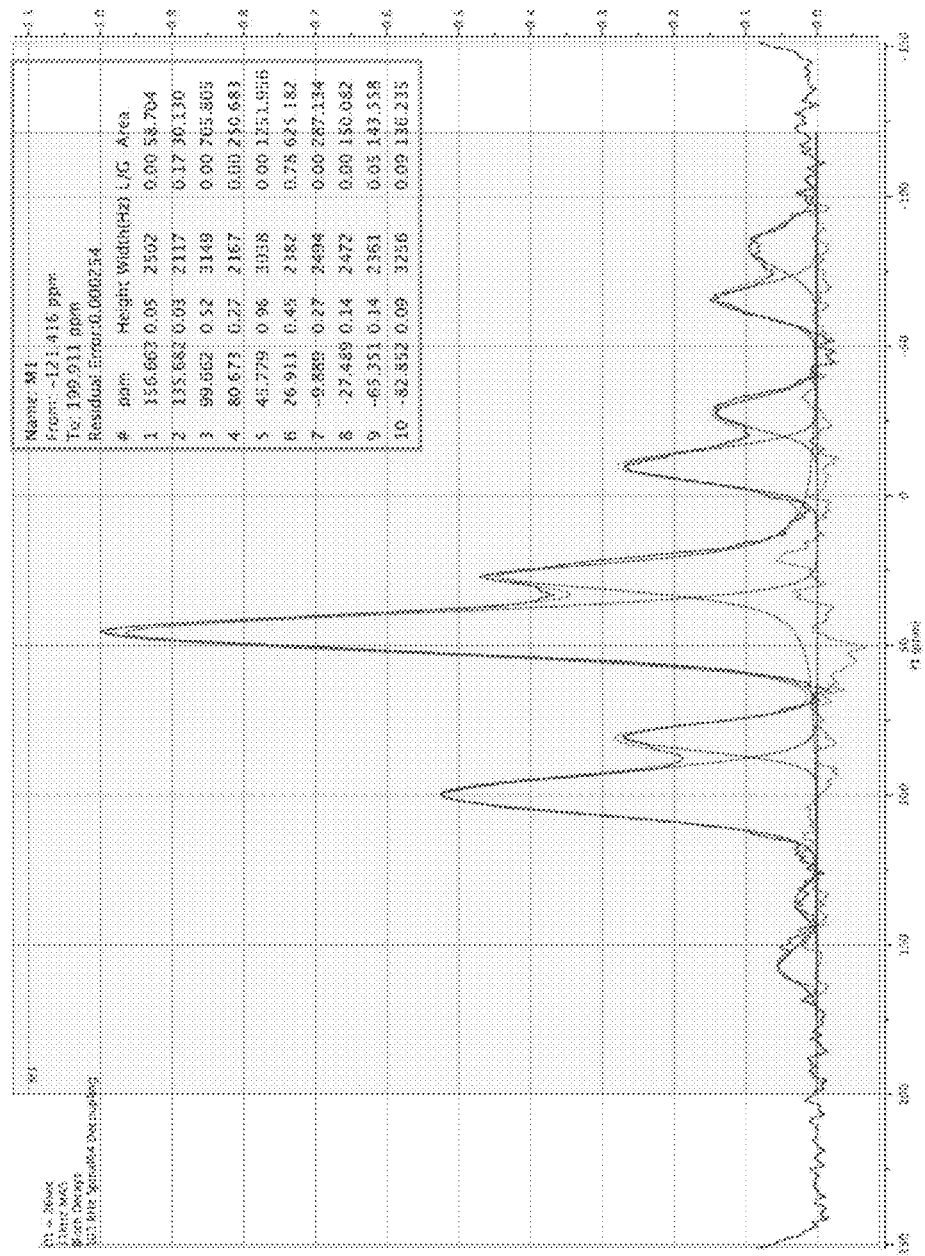
FIG. 2A shows the $^{31}$P NMR spectrum from FIG. 2 with a "deconvoluted" spectrum superimposed over the original spectrum.
Figure 3:
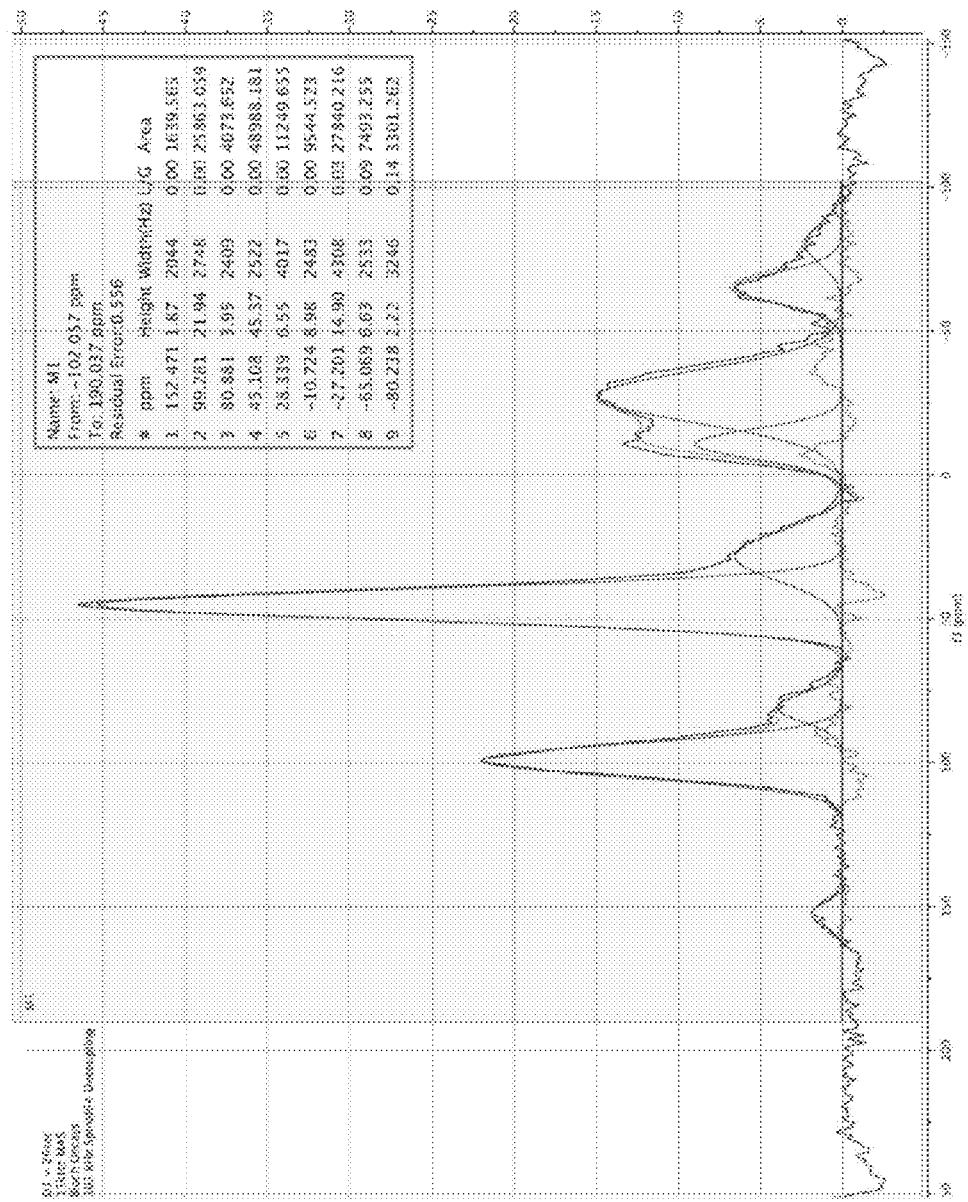
FIG. 3 shows the $^{31}$P NMR spectrum for the flame retardant, phosphorus-containing polymer from another commercially-available flame resistant textile article.

In order to quantify the relative amount of phosphorus atoms in each oxidation state, the resulting NMR spectra can be analyzed using global peak deconvolution (line fitting) performed by suitable analytical software, such as Mnova 6.0 software, with peak position, width, and Lorentzian/Gaussian character being the independent variables. In this method, the fitting iterations are continued until an acceptable fit is achieved. The resulting "deconvoluted" spectrum then shows a series of separate peaks at each chemical shift, and the area under these separate peaks (or at least a portion of the separate peaks) can be used to determine the relative amount of phosphorus atoms in each oxidation state. FIGS. 1, 2, and 3 show the $^{31}$P NMR spectra of three phosphorus-containing polymers from commercially-available, flame resistant fabrics. FIGS. 1A, 2A, and 3 also show a "deconvoluted" spectrum superimposed over the original NMR spectrum. FIGS. 1A, 2A, and 3 also include a table providing the area of each "deconvoluted" peak. As noted above, the area of these peaks can be used to calculate the relative amount of phosphorus atoms in each oxidation state.

Figure 4:
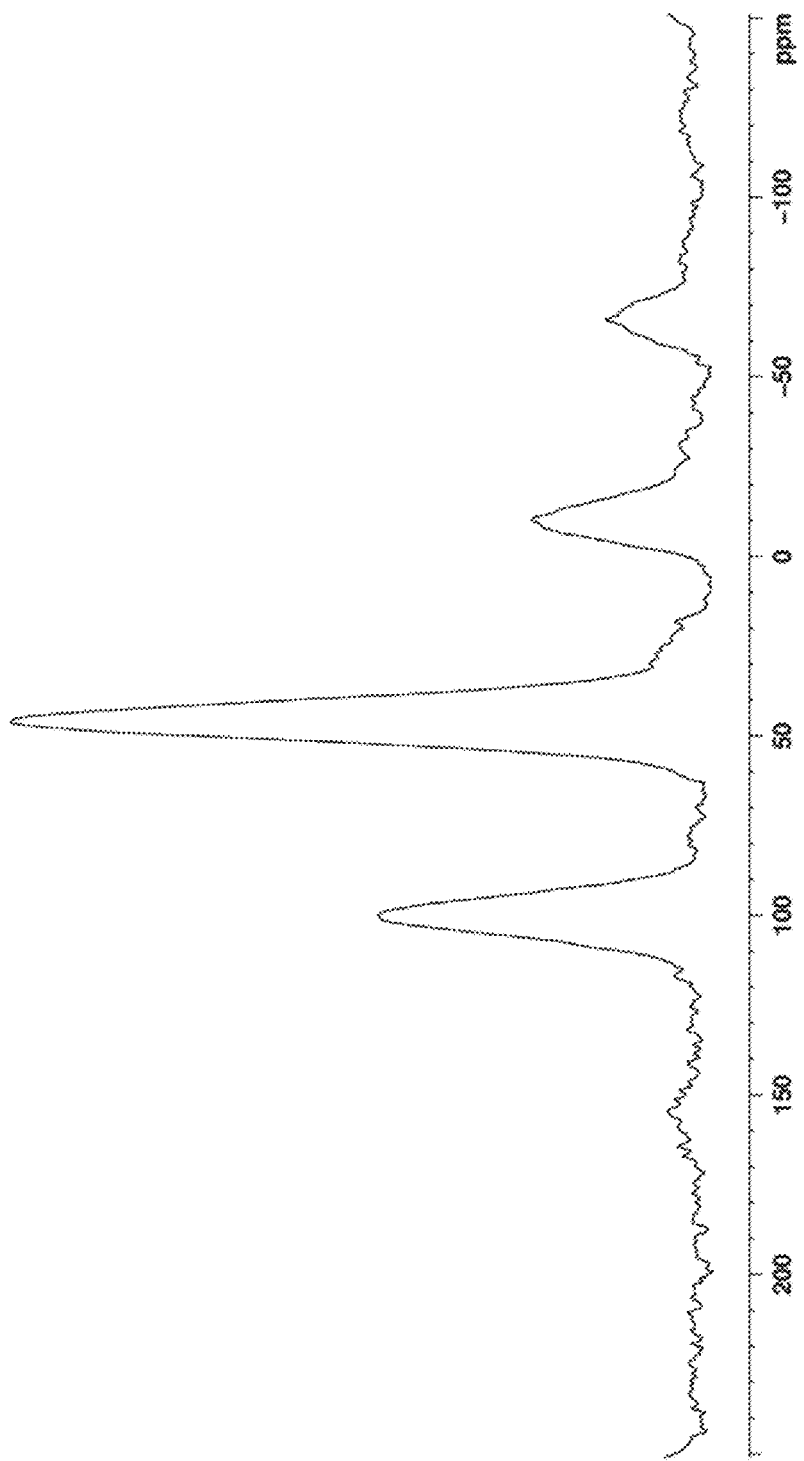
FIG. 4 is the $^{31}$P NMR spectrum for a flame retardant, phosphorus-containing polymer according to the invention that has been applied to a textile material.
Figure 4A:
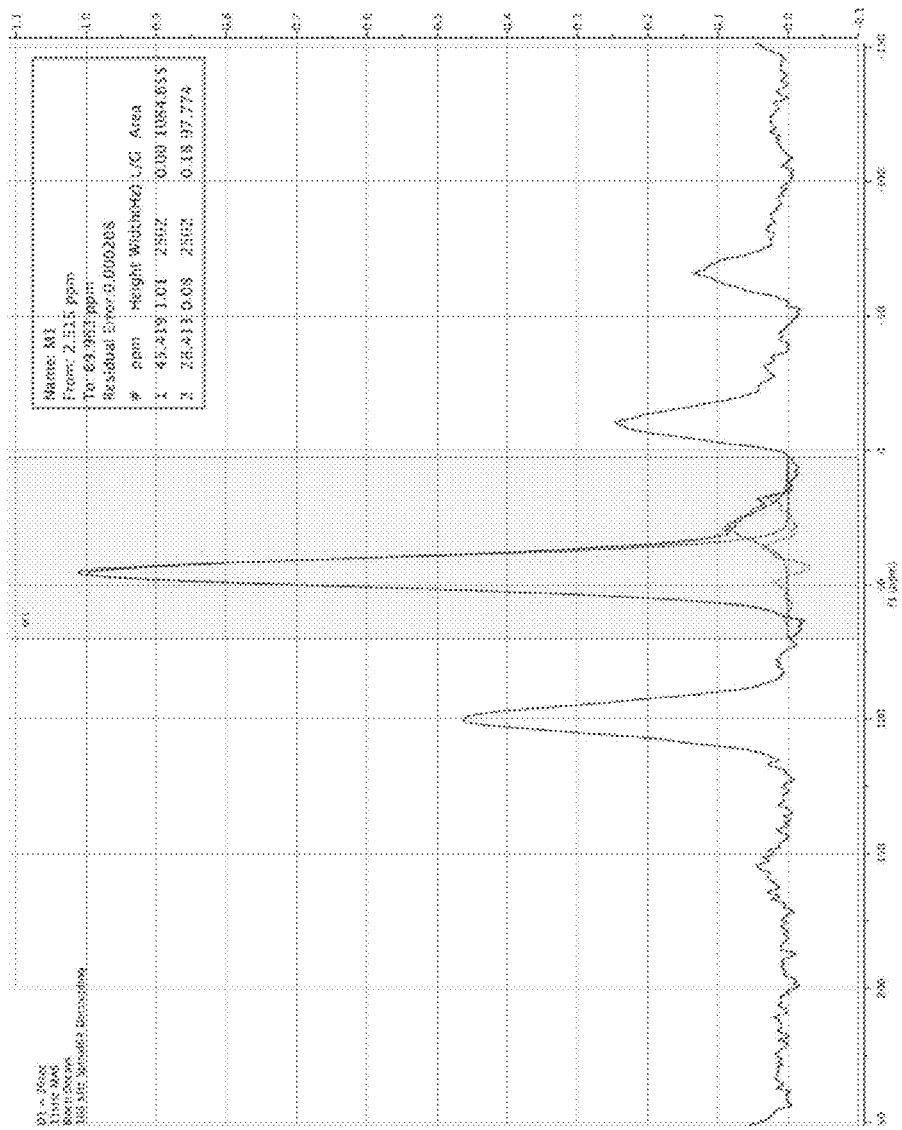
FIG. 4A shows the $^{31}$P NMR spectrum from FIG. 4 with a "deconvoluted" spectrum superimposed over the original spectrum.

FIG. 4 shows the $^{31}$P NMR spectrum for a representative phosphorus-containing polymer according to the invention that has been applied to a textile material. FIG. 4A shows a "deconvoluted" spectrum superimposed over the original NMR spectrum. As can be seen from the analysis of the spectrum and table, about 92% or more of the phosphorus atoms in the polymer are present in phosphine oxide moieties. In analyzing this spectrum, only the peaks appearing at chemical shifts of approximately 45 ppm (corresponding to the phosphine oxide moiety) and 28 ppm (corresponding to the phosphonium moiety) were used. This is due to the fact that the polymer contained a very low amount of phosphorus atoms in phosphonium moieties, and the only peak for the phosphonium moieties that could be reliably "deconvoluted" from the original NMR spectrum was the peak at a chemical shift of approximately 28 ppm.

The phosphorus-containing polymer of the invention is believed to contain a substantially greater amount of phosphorus atoms in phosphine oxide moieties than previously-known phosphorus-containing polymers. As noted above, applicants analyzed several commercially-available fabrics that have been treated with similar, known phosphorus-containing polymers. The NMR spectra for three such commercially-available fabrics are set forth as FIGS. 1-3. These analyses revealed that only about 67-72% of the phosphorus atoms were present in phosphine oxide moieties. This is substantially less than the amount of phosphorus atoms in phosphine oxide moieties contained in the polymer of the invention. Furthermore, the results for the commercially-available fabrics were very surprising. The conventional thinking in the industry was that all or substantially all of the phosphorus atoms in the polymers would be present in phosphine oxide moieties. Indeed, those in the industry believed that the conditions used to produce the phosphorus-containing polymers on these fabrics were sufficient to oxidize all or substantially all of the phosphorus atoms into phosphine oxide moieties. However, the NMR analyses described above clearly show that this is not the case—a relatively large portion of the phosphorus atoms remain in either phosphine or phosphonium moieties.

The observed difference in the amount of phosphorus atoms present in phosphine oxide moieties is not a trivial matter. For example, the phosphine oxide moiety is more robust and less susceptible to degradation than the phosphine and phosphonium moieties. So, increasing the amount of phosphorus atoms in phosphine oxide moieties should increase the durability of the resulting polymer. A more durable polymer will impart better long term flame resistance to those substrates (e.g., textile materials) to which it is applied. In particular, Applicants have observed improved durability of the phosphorus-containing polymer to industrial washing conditions where the high temperature, high detergency, and high pH of the wash water can lead to the hydrolytic degradation of phosphorus-containing polymers.

In addition to increased durability, a higher content of phosphine oxide moieties has been observed to improve the thermal protective performance of the polymer and any substrate (e.g., textile material) on which the polymer is disposed. As the phosphorus-containing polymer of the invention and similar phosphorus-containing polymers are exposed to high heat, the phosphorus atoms in the polymer are oxidized to various oxides of phosphorus, such as phosphoric acid, phosphates, and/or related species. The resulting oxides of phosphorus aid the formation of a "char" on the substrate that separates the flame or heat from the remaining polymer (or the substrate on which the polymer is disposed) and slows the heat transfer to this unburned fuel. The slowed heat transfer in turn provides flame resistance and thermal protection. However, the oxidation of the phosphorus atoms is an exothermic reaction, and it is believed that the heat released during this reaction can actually decrease the thermal protective performance of a polymer. As noted above, the phosphorus-containing polymer of the invention contains a relatively high amount of phosphorus atoms in the pentavalent, phosphine oxide state. These phosphorus atoms, which are already highly oxidized, will undergo less oxidation and release less heat before they are converted to the above-described oxides of phosphorus. Conversely, a polymer containing a relatively large amount of phosphorus atoms in phosphine moieties and/or phosphonium moieties, such as conventional polymers produced by known processes, will release a greater amount of heat as more of the phosphorus atoms in the polymer undergo oxidation to form the oxides of phosphorus.

Also, while not wishing to be bound to any particular theory, Applicants believe that phosphonium moieties in these phosphorus-containing polymers are largely responsible for the evolution of formaldehyde that has been observed with prior art polymers. More specifically, Applicants believe that the phosphonium moieties are relatively unstable and will over time degrade to yield a phosphine moiety and generate formaldehyde and other by-products. For example, the commercially-available fabrics tested above (i.e., the fabrics used to determine relative amounts of phosphorus atoms in different phosphorus-containing moieties) exhibited extractable formaldehyde contents of about 120-300 ppm as received. By way of contrast, the phosphorus-containing polymer of the invention, with its increased amount of phosphine oxide moieties, exhibits a much lower extractable formaldehyde content. For example, a textile material treated with a phosphorus-containing polymer according to the invention having about 86% of its phosphorus atoms in phosphine oxide moieties exhibited an extractable formaldehyde content of only about 80 ppm. Another textile material treated with a phosphorus-containing polymer according to the invention having about 95% of its phosphorus atoms in phosphine oxide moieties exhibited an extractable formaldehyde content of only about 18 ppm. These relatively low formaldehyde contents are desirable and can be easily remediated to acceptable levels using formaldehyde scavengers if necessary. The extractable formaldehyde content of the polymer and/or a substrate to which the polymer is applied can be measured using any suitable technique. Preferably, the extractable formaldehyde content is measured in accordance with International Standard ISO 14184-1 entitled "Textiles-Determination of formaldehyde."

The phosphorus-containing polymer can be produced by any suitable process. However, in another embodiment, the invention provides a process for producing the phosphorus-containing polymer. The process generally comprises the steps of: (a) providing a phosphonium compound comprising at least one phosphonium moiety; (b) providing a nitrogen-containing cross-linking compound, the nitrogen-containing cross-linking compound comprising two or more nitrogen-hydrogen bonds; (c) reacting the phosphorus-containing compound and the nitrogen-containing cross-linking compound in a condensation reaction to produce a first intermediate polymer; (d) exposing the first intermediate polymer to a Brønsted base under conditions sufficient to convert at least a portion of the phosphonium moieties to phosphine moieties thereby producing a second intermediate polymer; (e) oxidizing the second intermediate polymer by exposing the second intermediate polymer to a suitable oxidizing agent under conditions sufficient to oxidize at least a portion of the phosphorus atoms in the polymer to a pentavalent state thereby producing a phosphorus-containing polymer; and (f) exposing the phosphorus-containing intermediate polymer to a Brønsted base to neutralize at least a portion of acid generated by the preceding oxidation step.

The phosphonium compound used in the method preferably comprises a phosphonium moiety conforming to the structure of Formula (I)

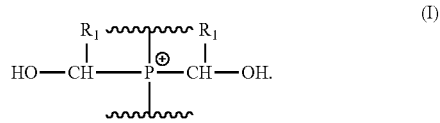

In the structure of Formula (I), $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl. In the structure of Formula (I), the partial bonds (i.e., the bonds truncated by the wavy line) represent bonds to other groups or moieties. For example, these other group or moieties can be hydroxyalkyl groups having a similar structure to those depicted in Formula (I), or they can be moieties comprised of a linking group bonded to another phosphonium moiety having a similar structure.

Thus, in certain embodiments, the phosphonium compound can be a phosphonium salt conforming to the structure of Formula (II)

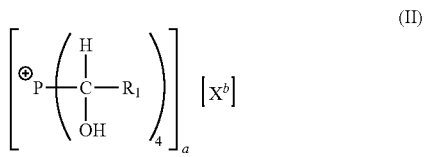

(II)

In the structure of Formula (II), $R_1$ can be any suitable group, such as an alkyl group, a haloalkyl group, an alkenyl group, or a haloalkenyl group. In a preferred embodiment, $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl. In another preferred embodiment, $R_1$ can be hydrogen. In the structure of Formula (II), X represents an anion and can be any suitable monatomic or polyatomic anion. In a preferred embodiment, X can be an anion selected from the group consisting of halides (e.g., chloride), sulfate, hydrogen sulfate, phosphate, acetate, carbonate, bicarbonate, borate, and hydroxide. In another preferred embodiment, X is a sulfate anion. In the structure of Formula (II), b represents the charge of the anion X. Therefore, in order to provide a phosphonium compound that is charge neutral, the number of phosphonium cations present in the compound is equal to (−b). Examples of such phosphonium compounds that are suitable for use in the process of the invention include, but are not limited to, tetrahydroxymethyl phosphonium salts, such as tetrahydroxymethyl phosphonium chloride, tetrahydroxymethyl phosphonium sulfate, tetrahydroxymethyl phosphonium acetate, tetrahydroxymethyl phosphonium carbonate, tetrahydroxymethyl phosphonium borate, and tetrahydroxymethyl phosphonium phosphate.

The phosphonium compound used in the process can also be a "precondensate," which is a phosphonium compound made by reacting a phosphonium salt with a suitable cross-linking agent. Phosphonium salts suitable for use in making such precondensates include, but are not limited to, the phosphonium salt compound conforming to the structure of Formula (II) above. Cross-linking agents suitable for making such precondensates include, but are not limited to, urea, alkylene urea, a guanidine (i.e., guanidine, a salt thereof, or a guanidine derivative), guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. Phosphonium condensates suitable for use in generating the polymer of the invention are well known in the art. Examples of such precondensates are described, for example, in U.S. Pat. No. 7,713,891 (Li et al.); U.S. Pat. No. 8,012,890 (Li et al.); and U.S. Pat. No. 8,012,891 (Li et al.). The synthesis of such condensates is also described, for example, in Frank et al. (*Textile Research Journal*, November 1982, pages 678-693) and Frank et al. (*Textile Research Journal*, December 1982, pages 738-750). Some of these precondensates are also commercially available, for example, as PYROSAN® CFR from Emerald Performance Materials.

In one possible embodiment, the phosphonium compound can be a precondensate made by reacting a phosphonium salt, such as that described above, with melamine or a melamine derivative. Preferably, the melamine compound conforms to the structure of Formula (III)

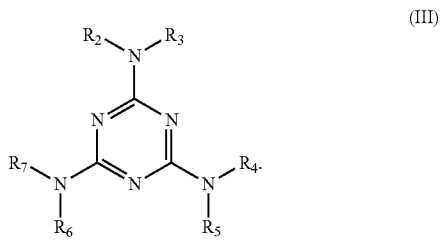

(III)

In the structure of Formula (III), $R_2$, $R_3$, $R_4$, $R_5$, $R_6$, and $R_7$ can be any suitable groups. In a preferred embodiment, $R_2$, $R_3$, $R_4$, $R_5$, $R_6$, and $R_7$ are independently selected from the group consisting of hydrogen, hydroxymethyl, and alkoxymethyl. Suitable compounds include, but are not limited to, melamine, methylolated melamines, and alkoxymethyl melamines (e.g., etherified methylol melamines). Such a precondensate can be made by reacting the phosphonium salt with one melamine compound or a mixture of two or more melamine compounds.

The reactant mixture used to make the precondensate described above can contain any suitable amounts of the phosphonium salt and the melamine compound. The amounts of the phosphonium salt and the melamine compound in the reactant mixture can be expressed through a molar ratio of the two components in the reactant mixture. However, as will be understood by those skilled in the art (and as illustrated below), it is the phosphonium cation(s) in the phosphonium salt that participate in the reaction between the phosphonium salt and the melamine compound. (The phosphonium salt's counterion is simply there to balance the charge.) Thus, in order to accurately express the relative amount of each reactive component present in the reactant mixture, the molar amount of the phosphonium salt present in the reactant mixture should be normalized to express the number of reactive phosphonium cations contributed to the reactant mixture by the phosphonium salt. This can be simply done by taking the number of moles of the phosphonium salt present in the reactant mixture and multiplying this value by the number of phosphonium cations present in a molecule of the phosphonium salt. For example, if the reactant mixture contains one mole of a phosphonium salt containing two phosphonium cations per molecule (e.g., tetrahydroxymethyl phosphonium sulfate), then the reactant mixture will contain two moles of reactive phosphonium cations ([1 mole of tetrahydroxymethyl phosphonium sulfate]×[2 phosphonium cations per molecule of tetrahydroxymethyl phosphonium sulfate]=2 moles of phosphonium cations). If two or more phosphonium salts are present in the reactant mixture, then this calculation must be separately performed for each phosphonium compound. The results from each calculation can then be added to arrive at the total number of moles of reactive phosphonium cations present in the reactant mixture. The figure representing the number of moles of phosphonium cations present in the reactant mixture and the molar amount of the melamine compound can then be used to express the relative amounts of the phosphonium salt and the melamine compound in the reactant mixture (e.g., a molar ratio of phosphonium cations to melamine compound), as discussed below.

Preferably, the phosphonium salt and the melamine compound are present in the reactant mixture in an initial molar ratio of phosphonium cations to melamine compound of about 50:1 or less, about 40:1 or less, about 30:1 or less, about 25:1 or less, about 20:1 or less, about 15:1 or less, about 10:1 or less, or about 8:1 or less. The phosphonium salt and the melamine compound preferably are present in the reactant mixture in an initial molar ratio of phosphonium cations to melamine compound of about 3:1 or more or about 6:1 or more. In a preferred embodiment, the phosphonium salt and the melamine compound are present in the reactant mixture in an initial molar ratio of phosphonium cations to melamine compound of about 50:1 to about 3:1. In another preferred embodiment, the phosphonium salt and the melamine compound are present in the reactant mixture in an initial molar ratio of phosphonium cations to melamine compound of about 40:1 to about 3:1, about 30:1 to about 3:1, about 25:1 to about 3:1, about 20:1 to about 3:1, about 15:1 to about 3:1 (e.g., about 15:1 to about 6:1), about 10:1 to about 3:1, or about 8:1 to about 3:1 (e.g., about 6:1).

The reactant mixture used to produce the precondensate of a phosphonium salt and a melamine compound can contain other components in addition to the phosphonium salt and the melamine compound described above. For example, the reactant mixture can contain other nitrogenous compounds, such as urea, guanazole, biguanide, or alkylene ureas. While these other nitrogenous compounds can be present in the reactant mixture, they are typically present in a relatively small amount as compared to the amount of the melamine compound present in the reactant mixture. The reactant mixture can also contain a surfactant, such as an alkoxylated alcohol, which aids in the dispersion of the melamine compound. The reactant mixture can also contain one or more pH buffers, such as acetate salts (e.g., sodium acetate), phosphate salts (e.g., alkaline metal phosphate salts), tertiary amines, and amino alcohols.

The process can utilize one of the above-described phosphonium compounds, or the process can utilize a mixture of two or more such phosphonium compounds. For example, the process can utilize only a phosphonium salt or a precondensate as described above. Alternatively, the process can utilize a mixture of different phosphonium salts, a mixture of precondensates, or a mixture of one or more phosphonium salts and one or more precondensates.

The process of the invention utilizes a nitrogen-containing cross-linking compound to react with the phosphonium compound to produce an intermediate polymer. The nitrogen-containing cross-linking compound preferably comprises two or more nitrogen-hydrogen bonds. In the cross-linking compound, these hydrogen atoms can be bonded to the same nitrogen atom (such as in ammonia), or the hydrogen atoms can be bonded to different nitrogen atoms. Suitable cross-linking compounds include, for example, urea, alkylene urea, a guanidine (i.e., guanidine, a salt thereof, or a guanidine derivative), melamine, a melamine derivative, guanamine, guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. Preferably, the nitrogen-containing cross-linking compound is selected from the group consisting of ammonia, urea, alkylene urea compounds, melamine, guanidine, guanidine derivatives, dicyandiamide, and mixtures thereof.

In the process, the phosphonium compound and the nitrogen-containing cross-linking compound are reacted in a condensation reaction to produce a first intermediate polymer. In this condensation reaction, hydrogen-bearing nitrogen atoms in the cross-linking compound react with hydroxyalkyl groups on the phosphonium compound to form a link and eliminate water. The exact functional group produced by the reaction will vary depending on the nature of the cross-linking compound used. Further, because the nitrogen-containing cross-linking compound contains at least two nitrogen-hydrogen bonds, the cross-linking compound can react with at least two hydroxyalkyl groups, thereby allowing the polymer chain to be propagated. In this reaction step, the phosphonium compound and the nitrogen-containing cross-linking compound can be reacted in any suitable amount. The amounts of the two components can be expressed in terms of the initial weight ratio of the two components. In a preferred embodiment, the phosphonium compound and the cross-linking compound are present in the treatment composition in an initial weight ratio of about 1:2 or more, about 1:1 or more, about 3:2 or more, about 2:1 or more, or about 3:1 or more. In another preferred embodiment, the phosphonium compound and the cross-linking compound are present in the treatment composition in an initial weight ratio of phosphonium compound to cross-linking compound of about 10:1 or less, about 9:1 or less, about 8:1 or less, about 7:1 or less, about 6:1 or less, about 5:1 or less, about 4:1 or less, or about 3:1 or less. Thus, in certain preferred embodiments, the phosphonium compound and the cross-linking compound are present in the treatment composition in an initial weight ratio of phosphonium compound to cross-linking compound of about 1:2 to about 10:1 (e.g., about 1:2 to about 5:1), about 1:1 to about 10:1 (e.g., about 1:1 to about 8:1, about 1:1 to about 6:1, about 1:1 to about 5:1, or about 1:1 to about 4:1), about 3:2 to about 10:1 (e.g., about 3:2 to about 8:1, about 3:2 to about 4:1), or about 2:1 to about 10:1 (e.g., about 2:1 to about 8:1, about 2:1 to about 6:1, about 2:1 to about 5:1, about 2:1 to about 4:1, or about 2:1 to about 3:1). As noted above, more than one nitrogen-containing cross-linking compound can be used. If multiple nitrogen-containing cross-linking compounds are used, then the ratios above refer to the total amount of all of the nitrogen-containing cross-linking compounds.

In order to accelerate the condensation reaction between the phosphonium compound and the cross-linking compound, the reactant mixture can be heated. Such heating is not always necessary to achieve a satisfactory reaction rate. For example, when ammonia is used as the cross-linking compound, heating is not required. The time and elevated temperature used in this step can be any suitable combination of time and temperature that results in the reaction of the phosphonium compound and cross-linking compound to the desired degree. Suitable temperatures and times for this step will vary depending upon the oven used and the speed with which heat is transferred to the substrate, but suitable conditions can range from temperatures of about 149° C. (300° F.) to about 177° C. (350° F.) and times from about 1 minute to about 3 minutes.

After the phosphonium compound and the nitrogen-containing cross-linking compound react to form the first intermediate polymer, the first intermediate polymer is exposed to a Brønsted base. While not wishing to be bound to any particular theory, it is believed that phosphorus atoms in the intermediate polymer exist in equilibrium between trivalent phosphorus in phosphine moieties and tetravalent phosphorus in phosphonium moieties. When the first intermediate polymer is exposed to a Brønsted base, this equilibrium is shifted and at least a portion of the phosphorus atoms contained in phosphonium moieties in the polymer are converted to phosphine moieties. These phosphine moieties are more easily oxidized to phosphine oxide moieties in the following step(s). The result is a phosphorus-containing polymer containing a relatively high amount of phosphorus atoms in phosphine oxide moieties, higher than had been previously accomplished using known or conventional techniques for producing these polymers. This step of exposing the first intermediate polymer to the Brønsted base prior to oxidation is believed to be unique to the present process. Conventional processes for producing similar phosphorus-containing polymers entail the oxidation of an intermediate polymer prior to exposing the polymer to a Brønsted base. In such conventional processes, the polymer is not exposed to the oxidizing agent after it is exposed to the Brønsted base. Therefore, fewer of the phosphorus atoms are in an oxidation state that can be readily oxidized to the pentavalent state and, consequently, the polymers produced by these conventional processes contain fewer phosphorus atoms in phosphine oxide moieties than the polymers of the present invention. Applicants discovery of this effect is surprising and unexpected because the step of exposing the polymer to the Brønsted base was previously viewed simply as a means to neutralize acid produced by the oxidation step—no one realized it could convert phosphorus-containing moieties within the polymer to a state that is more easily oxidized to the desired pentavalent, phosphine oxide state.

The Brønsted base used in this step can be any suitable base, but strong bases, such as alkalis, are preferred. For example, sodium hydroxide (soda), potassium hydroxide (potash), calcium hydroxide (lime), or any combination thereof can be used. The Brønsted base typically is provided in the form of an aqueous solution that is applied to the intermediate polymer or in which the intermediate polymer is submerged. The Brønsted base can be contained in this solution in any suitable amount, but preferably the concentration of the base is great enough to yield a solution having a pH of about 12 or greater (e.g., about 13 or greater, or about 14). Preferably, the first intermediate polymer is exposed to the Brønsted base under conditions sufficient to raise the pH of the first intermediate polymer and/or the medium in which the first intermediate polymer is contained to about 6 or more.

Next, the second intermediate polymer (the polymer resulting from exposing the first intermediate polymer to the Brønsted base) is exposed to an oxidizing agent in order to oxidize at least a portion of the phosphorus atoms in the second intermediate polymer to phosphine oxide moieties, thereby yielding the desired phosphorus-containing polymer. Suitable oxidizing agents include, but are not limited to, oxygen (e.g., gaseous oxygen), hydrogen peroxide, sodium perborate, sodium hypochlorite, percarbonate (e.g., alkaline metal percarbonates), ozone, peracetic acid, and mixtures or combinations thereof. Suitable oxidizing agents also include compounds that are capable of generating hydrogen peroxide or peroxide species, which compounds can be used alone or in combination with any of the oxidizing agents listed above. In a preferred embodiment, the oxidizing agent is selected from the group consisting of hydrogen peroxide, sodium perborate, or sodium hypochlorite, and combinations thereof, with hydrogen peroxide being particularly preferred. The amount of oxidant can vary depending on the actual materials used, but typically the oxidizing agent is incorporated in a solution containing about 5% or more, about 10% or more, about 15% or more, about 20% or more, about 25% or more, or about 30% or more by weight of the oxidizing agent.

After the second intermediate polymer is oxidized, the resulting phosphorus-containing polymer preferably is further exposed to a Brønsted base. This second exposure to the Brønsted base can serve two purposes. First, it neutralizes at least a portion of the acid that is generated by the oxidation step. If such acid is not neutralized, it can over time degrade the polymer or a substrate to which the polymer is applied. Second, the second exposure to the Brønsted base can be used in preparation for a second oxidation step as described below. In this second scenario, the exposure to the Brønsted base can convert at least a portion of any remaining phosphonium moieties into phosphine moieties which will enable an even greater degree of oxidation of the phosphorus atoms to the desired pentavalent phosphine oxide state. This additional step can be performed using the conditions described above for the initial neutralization step performed on the first intermediate polymer. Preferably, the polymer is exposed to the Brønsted base under conditions sufficient to raise the pH of the polymer and/or the medium in which the polymer is contained to about 6 or more.

If the phosphorus-containing polymer is exposed to a Brønsted base an additional time as described above, the polymer can be again exposed to an oxidizing agent in order to further oxidize more of the phosphorus atoms in the polymer to phosphine oxide moieties. This step can be performed using the conditions described above for the initial oxidation step.

If the polymer is subjected to a second oxidation step as described above, the polymer can again be exposed to a Brønsted base. This step can be performed using the conditions described above for the initial neutralization step performed on the first intermediate polymer. Preferably, the polymer is exposed to the Brønsted base under conditions sufficient to raise the pH of the polymer and/or the medium in which the polymer is contained to about 6 or more.

The order of the steps in the process can, within certain parameters, be changed from the specific order mentioned above. For example, in one embodiment, the first intermediate polymer can first be oxidized as described above, then exposed to the Brønsted base, then oxidized again, and finally exposed to the Brønsted base again. The common parameter for any variation of the process steps will be that the polymer is exposed to a Brønsted base, then oxidized, and again exposed to a Brønsted base after the oxidation. As discussed above, Applicants believe that exposure to a Brønsted base prior to the oxidation step is needed in order to convert a greater portion of the phosphorus moieties in the polymer into a state that can be converted to phosphine oxide moieties in the oxidation step.

The conditions used in the process described above preferably yield a phosphorus-containing polymer in which about 75% or more of the phosphorus atoms in the polymer are present in phosphine oxide moieties conforming to a structure selected from the group consisting of Formula (X), Formula (XI), and Formula (XII). More preferably, about 80% or more of the phosphorus atoms in the polymer are present in phosphine oxide moieties conforming to a structure selected from the group consisting of Formula (X), Formula (XI), and Formula (XII). Most preferably, about 85% or more (e.g., about 90% or more) of the phosphorus atoms in the polymer are present in phosphine oxide moieties conforming to a structure selected from the group consisting of Formula (X), Formula (XI), and Formula (XII).

In each of the neutralization steps described above (i.e., steps in which the intermediate polymer is exposed to a Brønsted base), the solution comprising the Brønsted base can optionally further comprise a formaldehyde scavenging compound. Any compound capable of binding formaldehyde can be used, such as sodium sulfite. While not wishing to be bound to any particular theory, Applicants believe that the presence of the formaldehyde scavenging compound leads to the conversion of at least some of the phosphonium moieties to phosphine moieties, which can then be oxidized to phosphine oxide moieties as described above. More specifically, Applicants believe that the phosphonium moieties in the intermediate polymer react to yield a phosphine moiety and release formaldehyde and other by-products. However, even under the highly basic conditions employed in the above-described neutralization steps, the equilibrium for this reaction heavily favors the phosphonium moiety. In other words, only a relatively small quantity of phosphonium moieties will be converted to phosphine moieties before the reaction equilibrates and the conversion stops. Applicants believe that by binding the formaldehyde that is produced by this reaction, the formaldehyde can be effectively removed from the equilibrium reaction. And, by consuming one of the products in the equilibrium reaction, the equilibrium can be disturbed causing more phosphonium moieties to be converted into phosphine moieties. Then, it is believed there will be a greater number of phosphine moieties that are available to be converted into phosphine oxide moieties in subsequent oxidation steps. The end result will be a polymer containing a higher percentage of phosphine oxide moieties than would be achieved using conventional production processes.

After the above-described neutralization step, the resulting phosphorus-containing polymer can be rinsed to remove any impurities and unreacted materials. This rinse can be performed in any suitable solvent or medium, provided the medium does not degrade the phosphorus-containing polymer. Typically, the polymer is rinsed in water (e.g., running water) until the pH of the water is relatively neutral, such as a pH of about 6 to about 8, or about 7.

As briefly mentioned above, the phosphorus-containing polymer according to the invention is believed to be particularly well suited for use as a treatment to impart flame resistance to substrates, such as textile materials. As utilized herein, the term "flame resistant" refers to a material that burns slowly or is self-extinguishing after removal of an external source of ignition. The flame resistance of textile materials can be measured by any suitable test method, such as those described in National Fire Protection Association (NFPA) 701 entitled "Standard Methods of Fire Tests for Flame Propagation of Textiles and Films," ASTM D6413 entitled "Standard Test Method for Flame Resistance of Textiles (vertical test)", NFPA 2112 entitled "Standard on Flame Resistant Garments for Protection of Industrial Personnel Against Flash Fire", ASTM F1506 entitled "The Standard Performance Specification for Flame Resistant Textile Materials for Wearing Apparel for Use by Electrical Workers Exposed to Momentary Electric Arc and Related Thermal Hazards", and ASTM F1930 entitled "Standard Test Method for Evaluation of Flame Resistant Clothing for Protection Against Flash Fire Simulations Using an Instrumented Manikin."

Thus, in another embodiment, the invention provides an article comprising a textile material and a phosphorus-containing polymer according to the invention. The textile material has at least one surface, and the phosphorus-containing polymer described above is on at least a portion of this surface. Phosphorus-containing polymers suitable for use in this embodiment of the invention have been described, and each of the phosphorus-containing polymers described therein can be used in this article embodiment of the invention.

The article of the invention can comprise any suitable amount of the phosphorus-containing polymer. In a preferred embodiment, the phosphorus-containing polymer is present in the article in an amount that provides about 0.5% or more (e.g., about 1% or more, about 1.5% or more, about 2% or more, about 2.5% or more, about 3% or more, about 3.5% or more, about 4% or more, or about 4.5% or more) of elemental phosphorus based on the weight of the untreated textile material. In another preferred embodiment, the phosphorus-containing polymer is present in the article in an amount that provides about 5% or less (e.g., about 4.5% or less, about 4% or less, about 3.5% or less, about 3% or less, about 2.5% or less, about 2% or less, about 1.5% or less, or about 1% or less) of elemental phosphorus based on the weight of the untreated textile material. Preferably, the phosphorus-containing polymer is present in the article in an amount that provides about 1% to about 4%, about 1% to about 3%, or about 1% to about 2.5% of elemental phosphorus based on the weight of the untreated textile material.

The textile material used in this embodiment of the invention can be any suitable textile material. The textile material generally comprises a fabric formed from one or more pluralities or types of yarns. The textile material can be formed from a single plurality or type of yarn (e.g., the fabric can be formed solely from yarns comprising a blend of cellulosic fibers and synthetic fibers, such as polyamide fibers), or the textile material can be formed from several pluralities or different types of yarns (e.g., the fabric can be formed from a first plurality of yarns comprising cellulosic fibers and polyamide fibers and a second plurality of yarns comprising an inherent flame resistant fiber).

The yarns used in making the textile materials of the invention can be any suitable type of yarn. Preferably, the yarns are spun yarns. In such embodiments, the spun yarns can be made from a single type of staple fiber (e.g., spun yarns formed solely from cellulose fibers or spun yarns formed solely from inherent flame resistant fibers), or the spun yarns can be made from a blend of two or more different types of staple fibers (e.g., spun yarns formed from a blend of cellulose fibers and thermoplastic synthetic staple fibers, such as polyamide fibers). Such spun yarns can be formed by any suitable spinning process, such as ring spinning, air-jet spinning, or open-end spinning. In certain embodiments, the yarns are spun using a ring spinning process (i.e., the yarns are ring spun yarns).

The textile materials of the invention can be of any suitable construction. In other words, the yarns forming the textile material can be provided in any suitable patternwise arrangement producing a fabric. Preferably, the textile materials are provided in a woven construction, such as a plain weave, basket weave, twill weave, satin weave, or sateen weave. Suitable plain weaves include, but are not limited to, ripstop weaves produced by incorporating, at regular intervals, extra yarns or reinforcement yarns in the warp, fill, or both the warp and fill of the textile material during formation. Suitable twill weaves include both warp-faced and fill-faced twill weaves, such as 2/1, 3/1, 3/2, 4/1, 1/2, 1/3, or 1/4 twill weaves. In certain embodiments of the invention, such as when the textile material is formed from two or more pluralities or different types of yarns, the yarns are disposed in a patternwise arrangement in which one of the yarns is predominantly disposed on one surface of the textile material. In other words, one surface of the textile material is predominantly formed by one yarn type. Suitable patternwise arrangements or constructions that provide such a textile material include, but are not limited to, satin weaves, sateen weaves, and twill weaves in which, on a single surface of the fabric, the fill yarn floats and the warp yarn floats are of different lengths.

Preferably, the textile material comprises cellulosic fibers. As utilized herein, the term "cellulosic fibers" refers to fibers composed of, or derived from, cellulose. Examples of suitable cellulosic fibers include cotton, rayon, linen, jute, hemp, cellulose acetate, and combinations, mixtures, or blends thereof. Preferably, the cellulosic fibers comprise cotton fibers.

In those embodiments of the textile material comprising cotton fibers, the cotton fibers can be of any suitable variety. Generally, there are two varieties of cotton fibers that are readily available for commercial use in North America: the Upland variety (*Gossypium hirsutum*) and the Pima variety (*Gossypium barbadense*). The cotton fibers used as the cellulosic fibers in the invention can be cotton fibers of either the Upland variety, the Pima variety, or a combination, mixture, or blend of the two. Generally, cotton fibers of the Upland variety, which comprise the majority of the cotton used in the apparel industry, have lengths ranging from about 0.875 inches to about 1.3 inches, while the less common fibers of the Pima variety have lengths ranging from about 1.2 inches to about 1.6 inches. In a preferred embodiment, at least some of the cotton fibers used in the textile material are of the Pima variety, which are preferred due to their greater, more uniform length.

In those embodiments in which the textile material comprises cellulosic fibers, the cellulosic fibers can be present in the yarns making up the textile material in any suitable amount. For example, in preferred embodiments, the cellulosic fibers can comprise about 20% or more (e.g., about 30% or more), by weight, of the fibers present in one of the pluralities or types of yarn used in making the textile material. In a possibly preferred embodiment, the cellulosic fibers can comprise about 100%, by weight, of the fibers used in making the textile material. In certain other preferred embodiments, the yarn can include non-cellulosic fibers. In such preferred embodiments, the cellulosic fibers can comprise about 20% to about 100% (e.g., about 30% to about 90%), by weight, of the fibers present in one of the pluralities or types of yarn used in making the textile material. The remainder of the yarn can be made up of any suitable non-cellulosic fiber or combination of non-cellulosic fibers, such as the thermoplastic synthetic fibers and inherent flame resistant fibers discussed below.

In those embodiments in which the textile material comprises cellulosic fibers, the cellulosic fibers can be present in the textile material in any suitable amount. For example, in certain embodiments, the cellulosic fibers can comprise about 15% or more, about 20% or more, about 25% or more, about 30% or more, or about 35% or more, by weight, of the fibers present in the textile material. While the inclusion of cellulosic fibers can improve the comfort of the textile material (e.g., improve the hand and moisture absorbing characteristics), the exclusive use of cellulosic fibers can deleteriously affect the durability of the textile material. Accordingly, it may be desirable to use other fibers (e.g., synthetic fibers) in combination with the cellulosic fibers in order to achieve a desired level of durability. Thus, in such embodiments, the cellulosic fibers can comprise about 95% or less or about 90% or less, by weight, of the fibers present in the textile material. More specifically, in certain embodiments, the cellulosic fibers can comprise about 15% to about 95%, about 20% to about 95%, about 25% to about 95%, about 30% to about 95%, or about 30% to about 90%, by weight, of the fibers present in the textile material.

In certain embodiments of the invention, one or more of the yarns in the textile material can comprise thermoplastic synthetic fibers. For example, the yarn can comprise a blend of cellulosic fibers and thermoplastic synthetic fibers. These thermoplastic synthetic fibers typically are included in the textile material in order to increase its durability to, for example, industrial washing conditions. In particular, thermoplastic synthetic fibers tend to be rather durable to abrasion and harsh washing conditions employed in industrial laundry facilities and their inclusion in, for example, a cellulosic fiber-containing spun yarn can increase that yarns durability to such conditions. This increased durability of the yarn, in turn, leads to an increased durability for the textile material. Suitable thermoplastic synthetic fibers include, but are not necessarily limited to, polyester fibers (e.g., poly (ethylene terephthalate) fibers, poly(propylene terephthalate) fibers, poly(trimethylene terephthalate) fibers, poly (butylene terephthalate) fibers, and blends thereof), polyamide fibers (e.g., nylon 6 fibers, nylon 6,6 fibers, nylon 4,6 fibers, and nylon 12 fibers), polyvinyl alcohol fibers, and combinations, mixtures, or blends thereof.

In those embodiments in which the textile material comprises thermoplastic synthetic fibers, the thermoplastic synthetic fibers can be present in one of the pluralities or types of yarn used in making the textile material in any suitable amount. In certain preferred embodiments, the thermoplastic synthetic fibers comprise about 65% or less, about 60% or less, or about 50% or less, by weight, of the fibers present in one of the pluralities or types of yarn used in making the textile material. In certain preferred embodiments, the thermoplastic synthetic fibers comprise about 5% or more or about 10% or more, by weight, of the fibers present in one of the pluralities or types of yarn used in making the textile material. Thus, in certain preferred embodiments, the thermoplastic synthetic fibers comprise about 0% to about 65% (e.g., about 5% to about 65%), about 5% to about 60%, or about 10% to about 50%, by weight, of the fibers present in one of the pluralities or types of yarn used in making the textile material.

In one preferred embodiment, the textile material comprises a plurality of yarns comprising a blend of cellulosic fibers and synthetic fibers (e.g., synthetic staple fibers). In this embodiment, the synthetic fibers can be any of those described above, with polyamide fibers (e.g., polyamide staple fibers) being particularly preferred. In such an embodiment, the cellulosic fibers comprise about 30% to about 90% (e.g., about 40% to about 90%, about 50% to about 90%, about 70% to about 90%, or about 75% to about 90%), by weight, of the fibers present in the yarn, and the polyamide fibers comprise about 10% to about 50% (e.g., about 10% to about 40%, about 10% to about 35%, about 10% to about 30%, or about 10% to about 25%), by weight, of the fibers present in the yarn.

In those embodiments in which the textile material comprises thermoplastic synthetic fibers, the thermoplastic synthetic fibers can be present in the textile material in any suitable amount. For example, in certain embodiments, the thermoplastic synthetic fibers can comprise about 1% or more, about 2.5% or more, about 5% or more, about 7.5% or more, or about 10% or more, by weight, of the fibers present in the textile material. The thermoplastic synthetic fibers can comprise about 40% or less, about 35% or less, about 30% or less, about 25% or less, about 20% or less, or about 15% or less, by weight, of the fibers present in the textile material. More specifically, in certain embodiments, the thermoplastic synthetic fibers can comprise about 1% to about 40%, about 2.5% to about 35%, about 5% to about 30% (e.g., about 5% to about 25%, about 5% to about 20%, or about 5% to about 15%), or about 7.5% to about 25% (e.g., about 7.5% to about 20%, or about 7.5% to about 15%), by weight, of the fibers present in the textile material.

As noted above, certain embodiments of the textile material of the invention contain yarns comprising inherent flame resistant fibers. As utilized herein, the term "inherent flame resistant fibers" refers to synthetic fibers which, due to the chemical composition of the material from which they are made, exhibit flame resistance without the need for an additional flame retardant treatment. In such embodiments, the inherent flame resistant fibers can be any suitable inherent flame resistant fibers, such as polyoxadiazole fibers, polysulfonamide fibers, poly(benzimidazole) fibers, poly(phenylenesulfide) fibers, meta-aramid fibers, para-aramid fibers, polypyridobisimidazole fibers, polybenzylthiazole fibers, polybenzyloxazole fibers, melamine-formaldehyde polymer fibers, phenol-formaldehyde polymer fibers, oxidized polyacrylonitrile fibers, polyamide-imide fibers and combinations, mixtures, or blends thereof. In certain embodiments, the inherent flame resistant fibers are preferably selected from the group consisting of polyoxadiazole fibers, polysulfonamide fibers, poly(benzimidazole) fibers, poly(phenylenesulfide) fibers, meta-aramid fibers, para-aramid fibers, and combinations, mixtures, or blends thereof.

The inherent flame resistant fibers can be present in one of the pluralities or types of yarn used in making the textile material in any suitable amount. For example, in certain embodiments, the inherent flame resistant fibers can comprise about 100%, by weight, of the fibers present in one of the pluralities or types of yarn used in making the textile material. In those embodiments in which the textile material comprises a yarn containing a blend of cellulosic fibers and inherent flame resistant fibers, the inherent flame resistant fibers can comprise about 5% or more, about 10% or more, about 20% or more, about 30% or more, about 40% or more, or about 50% or more, by weight, of the fibers present in the yarn. Thus, in such embodiments, the inherent flame resistant fibers can comprise about 5% to about 95% or about 10% to about 65%, by weight, of the fibers present in the yarn. More preferably, in such an embodiment, the inherent flame resistant fibers can comprise about 20% to about 50%, by weight, of the fibers present in the yarn.

The inherent flame resistant fibers can be present in the textile material in any suitable amount. Generally, the amount of inherent flame resistant fibers included in the textile material will depend upon the desired properties of the final textile material. In certain embodiments, the inherent flame resistant fibers can comprise about 20% or more, about 25% or more, about 30% or more, about 35% or more, about 40% or more, or about 45% or more, by weight, of the fibers present in the textile material. In certain embodiments, the inherent flame resistant fibers can comprise about 75% or less, about 70% or less, about 65% or less, about 60% or less, about 55% or less, about 50% or less, about 45% or less, or about 40% or less, by weight, of the fibers present in the textile material. Thus, in certain embodiments, the inherent flame resistant fibers can comprise about 20% to about 70%, about 25% to about 75% (e.g., about 25% to about 60%, about 25% to about 50%, about 25% to about 45%, or about 25% to about 40%), about 30% to about 70%, about 35% to about 65%, about 40% to about 60%, or about 45% to about 55%, by weight, of the fibers present in the textile material.

The article of the invention preferably exhibits relatively low levels of extractable formaldehyde. For example, the article of the invention preferably exhibits an extractable formaldehyde content about 90 ppm or less. The article of the invention more preferably exhibits an extractable formaldehyde content of about 85 ppm or less, about 80 ppm or less, about 75 ppm or less, about 70 ppm or less, about 65 ppm or less, about 60 ppm or less, about 55 ppm or less, about 50 ppm or less, about 45 ppm or less, about 40 ppm or less, about 35 ppm or less, about 30 ppm or less, about 25 ppm or less, or about 20 ppm or less. The extractable formaldehyde content can be measured by any suitable method, but preferably is measured by the ISO method noted above.

The article of the invention can be made by any suitable process. However, in another embodiment, the invention provides a process for producing the article described above. The process comprises the steps of: (a) providing a textile material having at least one surface; (b) providing a phosphonium compound comprising at least one phosphonium moiety; (c) providing a nitrogen-containing cross-linking compound, the nitrogen-containing cross-linking compound comprising two or more nitrogen-hydrogen bonds; (d) applying the phosphonium compound and the nitrogen-containing compound to at least a portion of the surface of the textile material; (e) reacting the phosphorus-containing compound and the nitrogen-containing cross-linking compound in a condensation reaction to produce a first intermediate polymer on the surface of the textile material; (f) exposing the textile material to a Brønsted base to under conditions sufficient to convert at least a portion of the phosphonium moieties to phosphine moieties thereby producing a second intermediate polymer; (g) oxidizing the second intermediate polymer on the surface of the textile material by exposing the textile material to a suitable oxidizing agent under conditions sufficient to oxidize at least a portion of the phosphorus atoms in the polymer to a pentavalent state thereby producing a phosphorus-containing polymer on the surface of the textile material; and (h) exposing the textile material to a Brønsted base to neutralize at least a portion of acid generated by the preceding oxidation step.

The process for producing the article is very similar to the process for producing the phosphorus-containing polymer described above, with the polymer being produced on a textile material as opposed to some other medium. Accordingly, the phosphonium compound, nitrogen-containing cross-linking compound, Brønsted base, oxidizing agent, and reaction conditions described above can be used in this process embodiment of the invention. Furthermore, any of the textile materials described above in connection with the article embodiment can be used in this process.

The phosphonium compound and the nitrogen-containing cross-linking compound can be applied to the textile material in any suitable manner. For example, the phosphonium compound and the nitrogen-containing cross-linking compound can be contained in a treatment composition that is padded onto the textile material.

In order to accelerate the condensation reaction between the phosphonium compound and the nitrogen-containing cross-linking compound, the treated textile substrate can be heated to a temperature sufficient for the phosphonium compound and the nitrogen-containing cross-linking compound to react and produce an intermediate polymer on the textile material. The time and elevated temperature used in this step can be any suitable combination of time and temperature that results in the reaction of the phosphonium compound and nitrogen-containing cross-linking compound to the desired degree. When the textile material comprises cellulosic fibers, the time and elevated temperatures used in this step can also promote the formation of covalent bonds between the cellulosic fibers and the intermediate polymer produced by the condensation reaction, which is believed to contribute to the durability of the flame retardant treatment. However, care must be taken not to use excessively high temperatures or excessively long cure times that might result in excessive reaction of the intermediate polymer with the cellulosic fibers, which might weaken the cellulosic fibers and the textile material. Furthermore, it is believed that the elevated temperatures used in the curing step can allow the phosphonium compound and nitrogen-containing cross-linking compound to diffuse into the cellulosic fibers where they then react to form the intermediate polymer within the cellulosic fibers. Suitable temperatures and times for this step will vary depending upon the oven used and the speed with which heat is transferred to the textile substrate, but suitable conditions can range from temperatures of about 149° C. (300° F.) to about 177° C. (350° F.) and times from about 1 minute to about 3 minutes.

As with the process for producing the phosphorus-containing polymer described above, the process of preparing the treated textile material can entail additional oxidation and neutralization steps. Also, the order of the process steps can be varied within certain parameters. For example, the textile material can first be oxidized as described above, then exposed to the Brønsted base, then oxidized again, and finally exposed to the Brønsted base again. The common parameter for any variation of the process steps will be that the textile material is exposed to a Brønsted base, then oxidized, and again exposed to a Brønsted base after the oxidation. As discussed above, Applicants believe that exposure to a Brønsted base prior to the oxidation step is needed in order to convert a greater portion of the phosphorus moieties in the polymer into a state that can be converted to phosphine oxide moieties in the oxidation step.

After the treated textile material has been contacted with the Brønsted base solution and the oxidizing agent as described above, the treated textile material typically is rinsed to remove any unreacted components from the treatment composition, any residual oxidizing agent, and any residual components from the neutralizing solution. The treated textile material can be rinsed in any suitable medium, provided the medium does not degrade the phosphorus-containing polymer. Typically, the treated textile material is rinsed in water (e.g., running water) until the pH of the water is relatively neutral, such as a pH of about 6 to about 8, or about 7. After rinsing, the treated textile material is dried using suitable textile drying conditions.

If desired, the textile material can be treated with one or more softening agents (also known as "softeners") to improve the hand of the treated textile material. The softening agent selected for this purpose should not have a deleterious effect on the flammability of the resultant fabric. Suitable softeners include polyolefins, alkoxylated alcohols (e.g., ethoxylated alcohols), alkoxylated ester oils (e.g., ethoxylated ester oils), alkoxylated fatty amines (e.g., ethoxylated tallow amine), alkyl glycerides, alkylamines, quaternary alkylamines, halogenated waxes, halogenated esters, silicone compounds, and mixtures thereof. In a preferred embodiment, the softener is selected from the group consisting of cationic softeners and nonionic softeners.

The softener can be present in the textile material in any suitable amount. One suitable means for expressing the amount of treatment composition that is applied to the textile material is specifying the amount of softener that is applied to the textile material as a percentage of the weight of the untreated textile material (i.e., the textile material prior to the application of the treatment composition described herein). This percentage can be calculated by taking the weight of softener solids applied, dividing this value by the weight of the untreated textile material, and multiplying by 100%. Preferably, the softener is present in the textile material in an amount of about 0.1% or more, about 0.2% or more, or about 0.3% or more, by weight, based on the weight of the untreated textile material. Preferably, the softener is present in the textile material in an amount of about 10% or less, about 9% or less, about 8% or less, about 7% or less, about 6% or less, or about 5% or less, by weight, based on the weight of the untreated textile material. Thus, in certain preferred embodiments, the softener is present in the textile material in an amount of about 0.1% to about 10%, about 0.2% to about 9% (e.g., about 0.2% to about 8%, about 0.2% to about 7%, about 0.2% to about 6%, or about 0.2% to about 5%), or about 0.3% to about 8% (e.g., about 0.3% to about 7%, about 0.3% to about 6%, or about 0.3% to about 5%), by weight, based on the weight of the untreated textile material.

The softener can be applied to the textile material at any suitable time. For example, the softener can be added to the treatment composition described above (i.e., the treatment composition comprising the precondensate compound and the cross-linking composition) so that the softener is applied to the textile material at the same time as the phosphorus-containing polymer. The softener can also be applied to the textile material following treatment of the textile material with the treatment composition described above. In this instance, the softener typically would be applied after the textile material has been treated, dried, cured, oxidized, and, if desired, rinsed as described above. In a preferred embodiment of the method described herein, the softener is applied to the textile material in two separate applications. The first application is incorporated into the treatment composition (i.e., the treatment composition comprising the phosphonium compound and the cross-linking composition), and the second application is applied to the dry, treated textile material following the steps of treatment, drying, curing, oxidation, rinsing, and drying as described above. In this embodiment, the softener is divided among the two applications so that the final amount of softener applied to the treated textile material falls within one of the ranges described above.

To further enhance the textile material's hand, the textile material can optionally be treated using one or more mechanical surface treatments. A mechanical surface treatment typically relaxes stress imparted to the fabric during curing and fabric handling, breaks up yarn bundles stiffened during curing, and increases the tear strength of the treated fabric. Examples of suitable mechanical surface treatments include treatment with high-pressure streams of air or water (such as those described in U.S. Pat. No. 4,918,795, U.S. Pat. No. 5,033,143, and U.S. Pat. No. 6,546,605), treatment with steam jets, needling, particle bombardment, ice-blasting, tumbling, stone-washing, constricting through a jet orifice, and treatment with mechanical vibration, sharp bending, shear, or compression. A sanforizing process may be used instead of, or in addition to, one or more of the above processes to improve the fabric's hand and to control the fabric's shrinkage. Additional mechanical treatments that may be used to impart softness to the treated fabric, and which may also be followed by a sanforizing process, include napping, napping with diamond-coated napping wire, gritless sanding, patterned sanding against an embossed surface, shot-peening, sand-blasting, brushing, impregnated brush rolls, ultrasonic agitation, sueding, engraved or patterned roll abrasion, and impacting against or with another material, such as the same or a different fabric, abrasive substrates, steel wool, diamond grit rolls, tungsten carbide rolls, etched or scarred rolls, or sandpaper rolls.

EXAMPLE 1

A fiber blend of 88% pima cotton, and 12% type (6,6) nylon was carded, and drawn into a sliver. The sliver was subsequently spun into a roving and ring spun into a textile yarn. Yarns used for the warp were spun to a standard cotton count of 16/1 while the fill yarns were spun to a cotton count of 12/1. The fabric was woven using a yarn density of 90 ends per inch in the warp and 38 picks per inch in the fill direction in a 3×1 left-hand twill pattern. The resulting woven fabric was scoured, mercerized and range-dyed.

A flame retardant treatment formulation was created, which contained the following components:

TABLE 1

Flame retardant treatment formulation for the treatment of Sample 1.

| Component (Source) | Amount |
|---|---|
| Tetrahydroxymethyl phosphonium urea condensate (sold by Emerald Performance Materials under the trade name PYROSAN ® C-FR) | 50 parts by weight |
| Softening agent, which was a mixture of ethoxylated alcohol and alkyl ester (sold by Boehme Filatex under the trade name HIPOSOFT ® SFBR) | 4.4 parts by weight |
| Urea (from Aldrich Corporation) | 8.8 parts by weight |
| Sodium hydroxide solution, 12% by weight | 2 part by weight |
| Water | 34.8 parts by weight |

The dyed, woven fabric was impregnated with the above solution by padding, resulting in a wet pick-up of about 60% by weight. The fabric was then dried for about 4 minutes in a convection oven at a temperature of about 121° C. (250° F.). The fabric was then cured in the same convection oven at a temperature of about 177° C. (350° F.) for 2-3 minutes.
Oxidation and Neutralization No further processing was done for this example. The fabric was not oxidized or neutralized. The resulting treated fabric will hereinafter be referred to as Sample 1.

EXAMPLE 2

A fiber blend of 88% pima cotton, and 12% type (6,6) nylon was carded, and drawn into a sliver. The sliver was subsequently spun into a roving and ring spun into a textile yarn. Yarns used for the warp were spun to a standard cotton count of 16/1 while the fill yarns were spun to a cotton count of 12/1. The fabric was woven using a yarn density of 90 ends per inch in the warp and 38 picks per inch in the fill direction in a 3×1 left-hand twill pattern. The resulting woven fabric was scoured, mercerized and range-dyed.

A flame retardant treatment formulation was created, which contained the following components:

TABLE 2

Flame retardant treatment formulation for the treatment of Sample 2.

| Component (Source) | Amount |
|---|---|
| Tetrahydroxymethyl phosphonium urea condensate (sold by Emerald Performance Materials under the trade name PYROSAN ® C-FR) | 50 parts by weight |
| Softening agent, which was a mixture of ethoxylated alcohol and alkyl ester (sold by Boehme Filatex under the trade name HIPOSOFT ® SFBR) | 4.4 parts by weight |
| Urea (from Aldrich Corporation) | 8.8 parts by weight |
| Sodium hydroxide solution, 12% by weight | 2 part by weight |
| Water | 34.8 parts by weight |

The dyed, woven fabric was impregnated with the above solution by padding, resulting in a wet pick-up of about 60% by weight. The fabric was then dried for about 4 minutes in a convection oven at a temperature of about 121° C. (250° F.). The fabric was then cured in the same convection oven at a temperature of about 177° C. (350° F.) for 2-3 minutes.
Oxidation and Neutralization The fabric was then immersed in an aqueous solution containing hydrogen peroxide (25% by weight) for about 60 seconds at room temperature. The fabric was rinsed win warm tap water, and immediately thereafter, the fabric was immersed in an aqueous solution containing sodium hydroxide (6.0% by weight) for about 60 seconds at room temperature. The fabric was then rinsed in warm tap water and dried. The resulting treated fabric will hereinafter be referred to as Sample 2.

EXAMPLE 3

A fiber blend of 88% pima cotton, and 12% type (6,6) nylon was carded, and drawn into a sliver. The sliver was subsequently spun into a roving and ring spun into a textile yarn. Yarns used for the warp were spun to a standard cotton count of 16/1 while the fill yarns were spun to a cotton count of 12/1. The fabric was woven using a yarn density of 90 ends per inch in the warp and 38 picks per inch in the fill direction in a 3×1 left-hand twill pattern. The resulting woven fabric was scoured, mercerized and range-dyed.

A flame retardant treatment formulation was created, which contained the following components:

TABLE 3

Flame retardant treatment formulation for the treatment of Sample 3.

| Component (Source) | Amount |
|---|---|
| Tetrahydroxymethyl phosphonium urea condensate (sold by Emerald Performance Materials under the trade name PYROSAN ® C-FR) | 50 parts by weight |
| Softening agent, which was a mixture of ethoxylated alcohol and alkyl ester (sold by Boehme Filatex under the trade name HIPOSOFT ® SFBR) | 4.4 parts by weight |
| Urea (from Aldrich Corporation) | 8.8 parts by weight |
| Sodium hydroxide solution, 12% by weight | 2 part by weight |
| Water | 34.8 parts by weight |

The dyed, woven fabric was impregnated with the above solution by padding, resulting in a wet pick-up of about 60% by weight. The fabric was then dried for about 4 minutes in a convection oven at a temperature of about 121° C. (250° F.). The fabric was then cured in the same convection oven at a temperature of about 177° C. (350° F.) for 2-3 minutes.

Oxidation and Neutralization

The fabric was then immersed in an aqueous solution containing sodium hydroxide (6% by weight) for about 60 seconds at room temperature. The fabric was rinsed win warm tap water, and immediately thereafter, the fabric was immersed in an aqueous solution containing hydrogen peroxide (12.0% by weight) for about 60 seconds at room temperature. The fabric was then rinsed in warm tap water and dried. The resulting treated fabric will hereinafter be referred to as Sample 3.

EXAMPLE 4

A fiber blend of 88% pima cotton, and 12% type (6,6) nylon was carded, and drawn into a sliver. The sliver was subsequently spun into a roving and ring spun into a textile yarn. Yarns used for the warp were spun to a standard cotton count of 16/1 while the fill yarns were spun to a cotton count of 12/1. The fabric was woven using a yarn density of 90 ends per inch in the warp and 38 picks per inch in the fill direction in a 3×1 left-hand twill pattern. The resulting woven fabric was scoured, mercerized and range-dyed.

A flame retardant treatment formulation was created, which contained the following components:

TABLE 4

Flame retardant treatment formulation for the treatment of Sample 4.

| Component (Source) | Amount |
|---|---|
| Tetrahydroxymethyl phosphonium urea condensate (sold by Emerald Performance Materials under the trade name PYROSAN ® C-FR) | 50 parts by weight |
| Softening agent, which was a mixture of ethoxylated alcohol and alkyl ester (sold by Boehme Filatex under the trade name HIPOSOFT ® SFBR) | 4.4 parts by weight |
| Urea (from Aldrich Corporation) | 8.8 parts by weight |
| Sodium hydroxide solution, 12% by weight | 2 part by weight |
| Water | 34.8 parts by weight |

The dyed, woven fabric was impregnated with the above solution by padding, resulting in a wet pick-up of about 60% by weight. The fabric was then dried for about 4 minutes in a convection oven at a temperature of about 121° C. (250° F.). The fabric was then cured in the same convection oven at a temperature of about 177° C. (350° F.) for 2-3 minutes.

Oxidation and Neutralization

The fabric was then immersed in an aqueous solution containing hydrogen peroxide (25% by weight) for about 60 seconds at room temperature. The fabric was rinsed in warm tap water, and immediately thereafter, the fabric was immersed in an aqueous solution containing sodium hydroxide (6.0% by weight) at ambient temperature for about 60 seconds. The fabric was then immersed again in an aqueous solution containing hydrogen peroxide (25% by weight) for about 60 seconds at room temperature and rinsed in warm tap water. Immediately thereafter, the fabric was immersed in an aqueous solution containing sodium hydroxide (6.0% by weight) at ambient temperature for about 60 seconds. The fabric was then rinsed in warm tap water and dried. The resulting treated fabric will hereinafter be referred to as Sample 4.

DISCUSSION OF EXAMPLES 1-4

The relative percentage of phosphorus atoms present in phosphine oxide, phosphonium, and phosphine moieties within the polymer on each fabric sample was measured using the solid state NMR spectroscopy technique described above. In particular, a portion of each sample was cryogenically frozen and then ground to a powder that was used in the solid state NMR measurements. The values obtained by the NMR measurements were also qualitatively verified by a calorimetric test procedure. In particular, a known volume of an aqueous solution of hydrogen peroxide (15 mL of a 50% by weight solution) was dispensed into an insulated vessel and the temperature recorded using a precise digital thermometer. A 5 cm by 5 cm (2 inch by 2 inch) square piece of each sample fabric was immersed in the hydrogen peroxide solution and the temperature of the solution was allowed to equilibrate and then measured. The difference in temperature between the final equilibrated solution and the initial temperature was calculated and recorded. This calorimetric test provides an indirect measure of the degree of oxidation of the phosphorus atoms in the polymer on a fabric sample. In particular, if a similar fabric substrate is used and the amount of polymer on the fabric substrate is approximately equal, a higher change in temperature indicates that a greater percentage of the phosphorus atoms are present in lower oxidation states, such as the P(III) oxidation state. As can be seen from Table 5 below, this calorimetric measurement correlates well with the direct measurements obtained by the NMR method.

TABLE 5

Summary of NMR data and calorimetry data for Samples 1-4.

| | Calculated Percentage of Phosphorus Atoms | | | |
| Sample | Phosphine Oxide | Phosphonium | Phosphine | Calorimetry ($\Delta$° C.) |
|---|---|---|---|---|
| 1 | 5 | 83 | 12 | 1.8 |
| 2 | 35 | 37 | 29 | 2.3 |
| 3 | 89 | 11 | 0 | 0.5 |
| 4 | 91 | 9 | 0 | 0.5 |

As can be seen from the data set forth in Table 5, the phosphorus-containing polymers on Samples 3 and 4, which were produced by a process of the invention (i.e., a process in which the intermediate polymer is exposed to a Brønsted base prior to oxidation), contain a greater percentage of phosphorus atoms in phosphine oxide moieties than the polymers produced by other processes. For example, a comparison of the phosphine oxide content of the polymers on Samples 2, 3, and 4 reveals that the phosphine oxide content of the polymers of the invention (i.e., Samples 3 and 4) was over 50 percentage points higher than the phosphine oxide content of a polymer produced by a conventional process (i.e., Sample 2). Applicants submit that this result is very surprising given, for example, the fact that the only difference between the processes used to make Sample 2 and Sample 3 is the order of the oxidation and neutralization steps; all other conditions were the same.

Furthermore, Applicants submit that these differences in the oxidation states of the phosphorus atoms in the phosphorus-containing polymer are not a trivial matter. As discussed above, the higher phosphine oxide content of the polymers of the invention enable the polymer to better withstand the harsh industrial washing conditions typically used to launder fabrics treated with this type of polymer. Furthermore, the high oxidation state of the phosphorus atoms in the polymer means that less heat will be generated when the polymer (or a substrate on which the polymer is disposed) is exposed to a flame or other high heat event. With less heat being released by the polymer, an individual wearing a fabric treated with the polymer is less likely to suffer from harmful burns. In view of these differences, Applicants believe that the polymers of the invention and substrates treated with such polymers will prove particularly effective as flame retardants and flame resistant garments.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A phosphorus-containing polymer comprising a plurality of phosphorus atoms, wherein about 75% or more of the phosphorus atoms in the phosphorus-containing polymer are present in phosphine oxide moieties conforming to a structure selected from the group consisting of Formula (X), Formula (XI), and Formula (XII)

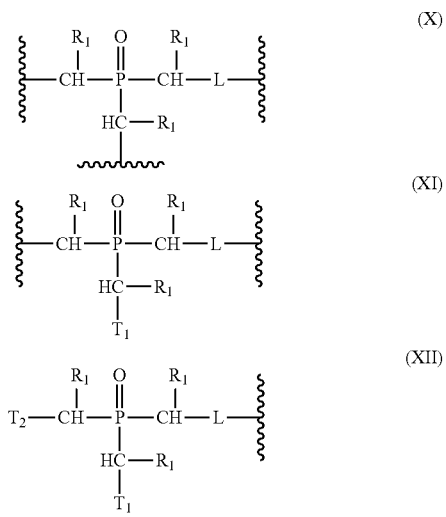

wherein, in each structure, $R_1$ is independently selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; $T_1$ and $T_2$ are independently selected from the group consisting of a hydroxy group and univalent moieties comprising at least one nitrogen atom; and L is a polyvalent linking group comprising at least one nitrogen atom.

2. The phosphorus-containing polymer of claim 1, wherein about 80% or more of the phosphorus atoms in the phosphorus-containing polymer are present in phosphine oxide moieties conforming to the structure of Formula (X).

3. The phosphorus-containing polymer of claim 2, wherein about 85% or more of the phosphorus atoms in the phosphorus-containing polymer are present in phosphine oxide moieties conforming to the structure of Formula (X).

4. The phosphorus-containing polymer of claim 1, wherein the remaining phosphorus atoms in the phosphorus-containing polymer are present in moieties selected from the group consisting of phosphine moieties and phosphonium moieties.

5. The phosphorus-containing polymer of claim 1, wherein $R_1$ is hydrogen.

6. The phosphorus-containing polymer of claim 1, wherein L is a polyvalent linking group produced by a reaction with a compound selected from the group consisting of ammonia, urea, alkylene urea compounds, melamine, guanidine, guanidine derivatives, dicyandiamide, and mixtures thereof.

7. A process for producing a phosphorus-containing polymer, the process comprising the steps of:
(a) providing a phosphonium compound comprising at least one phosphonium moiety, the phosphonium moiety conforming to the structure of Formula (I)

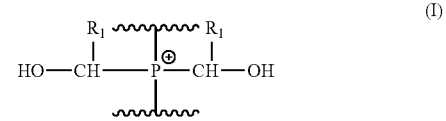

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl;

(b) providing a nitrogen-containing cross-linking compound, the nitrogen-containing cross-linking compound comprising two or more nitrogen-hydrogen bonds;
(c) reacting the phosphorus-containing compound and the nitrogen-containing cross-linking compound in a condensation reaction to produce a first intermediate polymer;
(d) exposing the first intermediate polymer to a Brønsted base under conditions sufficient to convert at least a portion of the phosphonium moieties to phosphine moieties thereby producing a second intermediate polymer;
(e) oxidizing the second intermediate polymer by exposing the second intermediate polymer to a suitable oxidizing agent under conditions sufficient to oxidize at least a portion of the phosphorus atoms in the polymer to a pentavalent state thereby producing a phosphorus-containing polymer; and
(f) exposing the phosphorus-containing intermediate polymer to a Brønsted base to neutralize at least a portion of acid generated by the preceding oxidation step.

8. The process of claim 7, wherein about 75% or more of the phosphorus atoms in the phosphorus-containing polymer are present in phosphine oxide moieties conforming to a structure selected from the group consisting of Formula (X), Formula (XI), and Formula (XII)

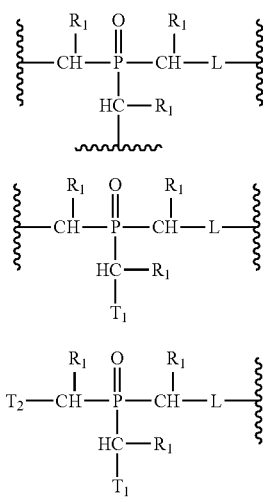

wherein, in each structure, $R_1$ is independently selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; $T_1$ and $T_2$ are independently selected from the group consisting of a hydroxy group and univalent moieties comprising at least one nitrogen atom; and L is a polyvalent linking group comprising at least one nitrogen atom.

9. The process of claim 8, wherein about 80% or more of the phosphorus atoms in the phosphorus-containing polymer are present in phosphine oxide moieties conforming to a structure selected from the group consisting of Formula (X), Formula (XI), and Formula (XII).

10. The process of claim 9, wherein about 85% or more of the phosphorus atoms in the polymer are present in phosphine oxide moieties conforming to a structure selected from the group consisting of Formula (X), Formula (XI), and Formula (XII).

11. The process of claim 7, wherein the remaining phosphorus atoms in the phosphorus-containing polymer are present in moieties selected from the group consisting of phosphine moieties and phosphonium moieties.

12. The process of claim 7, wherein $R_1$ is hydrogen.

13. The process of claim 7, wherein the nitrogen-containing cross-linking compound is selected from the group consisting of ammonia, urea, alkylene urea compounds, melamine, guanidine, guanidine derivatives, dicyandiamide, and mixtures thereof.

14. An article comprising a textile material having at least one surface and a phosphorus-containing polymer disposed on a least a portion of the surface, wherein the phosphorus-containing polymer comprises a plurality of phosphorus atoms, and wherein about 75% or more of the phosphorus atoms in the phosphorus-containing polymer are present in phosphine oxide moieties conforming to a structure selected from the group consisting of Formula (X), Formula (XI), and Formula (XII)

wherein, in each structure, $R_1$ is independently selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; $T_1$ and $T_2$ are independently selected from the group consisting of a hydroxy group and univalent moieties comprising at least one nitrogen atom; and L is a polyvalent linking group comprising at least one nitrogen atom.

15. The article of claim 14, wherein the textile material is a fabric selected from the group consisting of woven fabrics and knit fabrics.

16. The article of claim 14, wherein the textile material comprises cellulosic fibers.

17. The article of claim 14, wherein about 80% or more of the phosphorus atoms in the phosphorus-containing polymer are present in phosphine oxide moieties conforming to a structure selected from the group consisting of Formula (X), Formula (XI), and Formula (XII).

18. The article of claim 17, wherein about 85% or more of the phosphorus atoms in the phosphorus-containing polymer are present in phosphine oxide moieties conforming to a structure selected from the group consisting of Formula (X), Formula (XI), and Formula (XII).

19. The article of claim 14, wherein $R_1$ is hydrogen.

20. The article of claim 14, wherein L is a polyvalent linking group produced by a reaction with a compound selected from the group consisting of ammonia, urea, alkylene urea compounds, melamine, guanidine, guanidine derivatives, dicyandiamide, and mixtures thereof.

21. The article of claim 14, wherein the remaining phosphorus atoms in the phosphorus-containing polymer are present in moieties selected from the group consisting of phosphine moieties and phosphonium moieties.

22. A process for producing an article, the process comprising the steps of:
(a) providing a textile material having at least one surface;
(b) providing a phosphonium compound comprising at least one phosphonium moiety, the phosphonium moiety conforming to the structure of Formula (I)

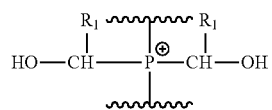

(I)

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl;
(c) providing a nitrogen-containing cross-linking compound, the nitrogen-containing cross-linking compound comprising two or more nitrogen-hydrogen bonds;
(d) applying the phosphorus-containing compound and the nitrogen-containing compound to at least a portion of the surface of the textile material;
(e) reacting the phosphorus-containing compound and the nitrogen-containing cross-linking compound in a condensation reaction to produce a first intermediate polymer on the surface of the textile material, the first intermediate polymer comprising a plurality of phosphorus atoms, at least a portion of the phosphorus atoms being present in phosphonium moieties;
(f) exposing the textile material to a Brønsted base under conditions sufficient to convert at least a portion of the phosphonium moieties in the first intermediate polymer to phosphine moieties thereby producing a second intermediate polymer on the surface of the textile material;
(g) oxidizing the second intermediate polymer on the surface of the textile material by exposing the textile material to a suitable oxidizing agent under conditions sufficient to oxidize at least a portion of the phosphorus atoms in the polymer to a pentavalent state thereby producing a phosphorus-containing polymer on the surface of the textile material; and
(h) exposing the textile material to a Brønsted base to neutralize at least a portion of acid generated by the preceding oxidation step.

23. The process of claim 22, wherein the textile material is a fabric selected from the group consisting of woven fabrics and knit fabrics.

24. The process of claim 22, wherein the textile material comprises cellulosic fibers.

25. The process of claim 22, wherein about 75% or more of the phosphorus atoms in the phosphorus-containing polymer are present in phosphine oxide moieties conforming to a structure selected from the group consisting of Formula (X), Formula (XI), and Formula (XII)

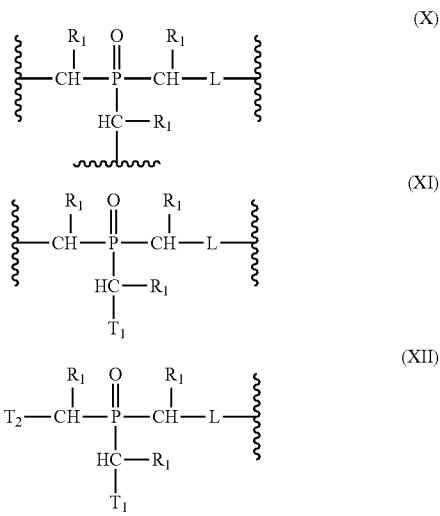

wherein, in each structure, $R_1$ is independently selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; $T_1$ and $T_2$ are independently selected from the group consisting of a hydroxy group and univalent moieties comprising at least one nitrogen atom; and L is a polyvalent linking group comprising at least one nitrogen atom.

26. The process of claim 25, wherein about 80% or more of the phosphorus atoms in the phosphorus-containing polymer are present in phosphine oxide moieties conforming to a structure selected from the group consisting of Formula (X), Formula (XI), and Formula (XII).

27. The process of claim 26, wherein about 85% or more of the phosphorus atoms in the polymer are present in phosphine oxide moieties conforming to a structure selected from the group consisting of Formula (X), Formula (XI), and Formula (XII).

28. The process of claim 22, wherein the remaining phosphorus atoms in the phosphorus-containing polymer are present in moieties selected from the group consisting of phosphine moieties and phosphonium moieties.

29. The process of claim 22, wherein $R_1$ is hydrogen.

30. The process of claim 22, wherein the nitrogen-containing cross-linking compound is selected from the group consisting of ammonia, urea, alkylene urea compounds, melamine, guanidine, guanidine derivatives, dicyandiamide, and mixtures thereof.

* * * * *